United States Patent
Schoch

(10) Patent No.: US 6,273,705 B1
(45) Date of Patent: Aug. 14, 2001

(54) BLOW-PIN HAVING AN IMPROVED SEAL ASSEMBLY

(75) Inventor: Walter K. Schoch, Peachtree City, GA (US)

(73) Assignee: Crown Cork & Seal Technologies Corporation, Alsip, IL (US)

(*) Notice: Subject to any disclaimer, the term of this patent is extended or adjusted under 35 U.S.C. 154(b) by 0 days.

(21) Appl. No.: 09/396,684

(22) Filed: Sep. 14, 1999

(51) Int. Cl.[7] .................................................. B29C 49/58
(52) U.S. Cl. .................................................. 425/535
(58) Field of Search .................................. 425/534, 535; 198/803.7, 803.8

(56) References Cited

U.S. PATENT DOCUMENTS

| | | | |
|---|---|---|---|
| 4,086,999 | * | 5/1978 | McDonald .......................... 425/534 |
| 4,390,338 | | 6/1983 | Bowers et al. ..................... 425/525 |
| 4,572,355 | * | 2/1986 | Hunter ............................... 425/534 |
| 4,767,310 | * | 8/1988 | Neumann et al. .................. 425/535 |
| 4,890,726 | * | 1/1990 | Wissmann .......................... 425/534 |
| 5,137,443 | * | 8/1992 | Munoz et al. ...................... 425/534 |
| 5,320,364 | * | 6/1994 | Mistrater et al. ................ 198/803.7 |
| 5,454,707 | * | 10/1995 | Mitchell et al. .................. 425/535 |
| 5,498,152 | * | 3/1996 | Unterlander et al. ............. 425/534 |

* cited by examiner

*Primary Examiner*—Robert Davis
(74) *Attorney, Agent, or Firm*—Woodcock Washburn Kurtz Mackiewicz & Norris LLP

(57) ABSTRACT

A blow-pin assembly includes a circular body, a ring member, and a seal assembly. The body and the ring member define a central passage. The seal assembly comprises a seal band. The body and the ring member retain the seal band proximate an outer circumferential surface of the body. A neck portion of a parison is positioned over the outer circumferential surface. Pressurized air is routed through the central passage and into the parison during blow-molding operations. The pressurized air causes the parison to expand into the sides of a surrounding mold, thus forming the parison into a hollow object such as a container. The pressurized air also urges the seal band into the parison neck portion, thereby inhibiting leakage of the pressurized air between the neck portion and the blow-pin assembly.

29 Claims, 23 Drawing Sheets

US 6,273,705 B1

BLOW-PIN HAVING AN IMPROVED SEAL ASSEMBLY

FIELD OF THE INVENTION

The present invention relates to blow-pins for use in blow-molding operations. More specifically, the invention pertains to an improved seal assembly for blow pins.

BACKGROUND OF THE INVENTION

So-called blow-pins are utilized to form hollow objects, such as containers, by a process known as blow-molding. A typical blow-pin assembly 10 is illustrated in FIG. 1. The blow-pin assembly 10 includes a circular body 12 having an outer circumferential surface 12a. The body 12 is disposed about a central axis C1. The body 12 defines a circular groove 14 proximate the outer circumferential surface 12a. The body 12 also defines a central passage 16. A plurality of through holes 18 are disposed between the groove 14 and the central passage 16. The through holes 18 place the groove 14 in fluid communication with the central passage 16.

The blow-pin assembly 10 further includes an O-ring 20. The O-ring 20 is disposed within the groove 14, as shown in FIG. 1. The O-ring 20 is typically formed from an elastic material such as rubber.

The blow-pin assembly 10 is used in conjunction with a thermoplastic parison 22 having a neck portion 22a (for clarity, only the neck portion 22a is shown in FIG. 1). The blow-pin assembly is used in conjunction with a hollow mold (not shown). The neck portion 22a is positioned over the body outer circumferential surface 12a during blow-molding operations. The remaining portion of the parison 22 is positioned within the mold. Pressurized air is directed into the parison 22 by way of the central passage 16, in the direction denoted by the arrow 24. The pressurized air causes the parison 22 to expand. The parison 22 expands until it contacts the inner surfaces of the mold. Contact with the inner surfaces restrains the expanding parison 22, and thereby causes the parison 22 to assume the shape of the mold.

The groove 14 is pressurized during blow-molding operations. More specifically, pressurized air from the central passage 16 pressurizes the groove 14 by way of the through holes 18. Pressurization of the groove 14 urges the O-ring 20 outward, into the parison neck portion 22a. This contact inhibits leakage of air from the pressurized area within the parison 22. More specifically, the O-ring 20 inhibits leakage of pressurized air between the parison neck portion 22a and outer circumferential surface 12a.

O-rings such as the O-ring 20 have substantial disadvantages when utilized in the above-described application. For example, the elastic material from which the O-ring 20 is formed typically experiences chafing after repeated usage. Such chafing reduces the useful life of the O-ring 20. This characteristic necessitates frequent replacement of the O-ring 20 when the blow-pin assembly 10 is utilized in high-rate-of-production applications. Frequent replacement of the O-ring 20 increases the operating cost of the blow-pin assembly 10, and can result in costly interruptions in the production process. Furthermore, O-ring chafing reduces the sealing effectiveness of the O-ring 20. A reduction in sealing effectiveness can lead to quality-control problems associated with insufficient air pressure within the parison 22 during blow-molding operations.

In light of the above discussion, a need exists for a blow-pin assembly having an improved sealing mechanism. In particular, the sealing mechanism should be more durable than commonly-used seals. The present invention is directed to this goal.

SUMMARY OF THE INVENTION

The present invention provides a blow-pin assembly for use in molding hollow objects from thermoplastic parisons having a neck portion. The molding process is conducted using pressurized air. The blow-pin assembly comprises a circular body having a bottom surface. The body also includes an outer circumferential surface for receiving the neck portion of the parison.

The blow-pin assembly further comprises a ring member that contacts the body bottom surface. The blow-pin assembly also includes an annular seal band. The seal band is retained by the body bottom surface and the ring member proximate the body outer circumferential surface. The seal band is urged into contact with the parison neck portion by the pressurized air. The seal band thus inhibits leakage of the pressurized air between the parison and the blow-pin assembly. The seal band is formed from an abrasion-resistant material such as stainless steel.

In a preferred embodiment of the invention, the body defines a central passage for receiving the pressurized air. The body also defines a first circular recess that adjoins the bottom surface and the outer circumferential surface. Furthermore, the body defines a through hole that extends between the central passage and the first recess. The through hole directs pressurized air from the central passage to the first recess.

The ring member has a top surface that defines a second circular recess. The ring member top surface is fixedly coupled to the body bottom surface so that the first and the second recesses substantially align and form a groove that receives the seal band.

The groove includes a contact surface and the seal band includes first and second contact surfaces. The second contact surface has a substantially identical geometric profile to the contact surface of the groove. The pressurized air from the cental passage urges the first contact surface of the seal band into contact with the parison. The pressurized air from the cental passage also urges the second contact surface of the seal band into surface contact with the contact surface of the groove. The seal band thereby inhibits leakage of pressurized air from both the parison and the groove.

Preferably, the seal band has a substantially V-shaped cross section, and includes a first and a second edge. The groove has a first notch and a second notch that receive the first and the second edges, respectively. This arrangement causes the seal band to be retained in and aligned with the groove.

The seal band has one split line. The blow-pin assembly preferably includes an elastic O-ring. The O-ring is disposed within the groove between the through hole and the seal band. The O-ring is urged against the seal band in response to the pressurized air.

In another preferred embodiment of the invention, the body bottom surface defines a circular recess. The ring member is slidably disposed within the recess so that the ring member is linearly translatable in a first direction in response to the pressurized air. The translation of the ring member in the first direction urges the seal band into the parison neck portion. The seal band thereby inhibits leakage of the pressurized air between the parison and the blow-pin assembly. Preferably, the seal band has a substantially wedge-shaped portion and the ring member has an angled surface that is oblique to the first direction. The wedge-shaped portion slidably engages the angled surface in response to the pressurized air. The engagement of the wedge-shaped portion and the angled surface urges the seal band into the parison neck portion.

Preferably, the bottom surface of the body has a substantially planar portion that is substantially perpendicular to the first direction. The seal band is adapted to abut the substantially planar portion so as to restrain the seal band in the first direction. Furthermore, the seal band preferably has a substantially L-shaped cross-section, and the ring member preferably has a substantially planar surface that is substantially perpendicular to the first direction. The seal band is adapted to abut the substantially planar surface so as to restrain the seal band in a direction substantially opposite the first direction.

An alternative embodiment of the blow-pin assembly comprises a circular body having an outer circumferential surface. The body is centered about a central axis of the blow-pin assembly. The blow-pin assembly also includes a circular gasket having a top surface, an opposing bottom surface, and an outer circumferential surface. The gasket top surface axially abuts the body, and the gasket is centered about the central axis. The blow-pin assembly further comprises a ring member. The ring member axially abuts the gasket bottom surface, and is centered about the central axis. The ring member has an outer circumferential surface for receiving the parison neck portion. The outer circumferential surface of the ring member has a diameter that is less than the diameters of the body outer circumferential surface and the gasket outer circumferential surface. Hence, the gasket is adapted to abut the parison neck portion, and the gasket inhibits leakage of the pressurized air between the parison and the blow-pin assembly.

Another alternative embodiment of the blow-pin assembly comprises a circular body having a bottom surface. The body also has an outer circumferential surface for receiving a neck portion of a parison. The blow-pin assembly also includes a ring member that contacts the body bottom surface. The blow-pin assembly further comprises an O-ring having a substantially triangular cross-section. The O-ring is retained by the body bottom surface and the ring member proximate the body outer circumferential surface. The O-ring is urged into contact with the parison neck portion in response to the pressurized air. The O-ring thus inhibits leakage of the pressurized air between the parison and the blow-pin assembly.

BRIEF DESCRIPTION OF THE DRAWINGS

The foregoing summary, as well as the following detailed description of a preferred embodiment, is better understood when read in conjunction with the appended drawings. For the purpose of illustrating the invention, the drawings show an embodiment that is presently preferred. The invention is not limited, however, to the specific instrumentalities disclosed in the drawings. In the drawings.

DESCRIPTION OF THE PREFERRED EMBODIMENTS

Figure 1:
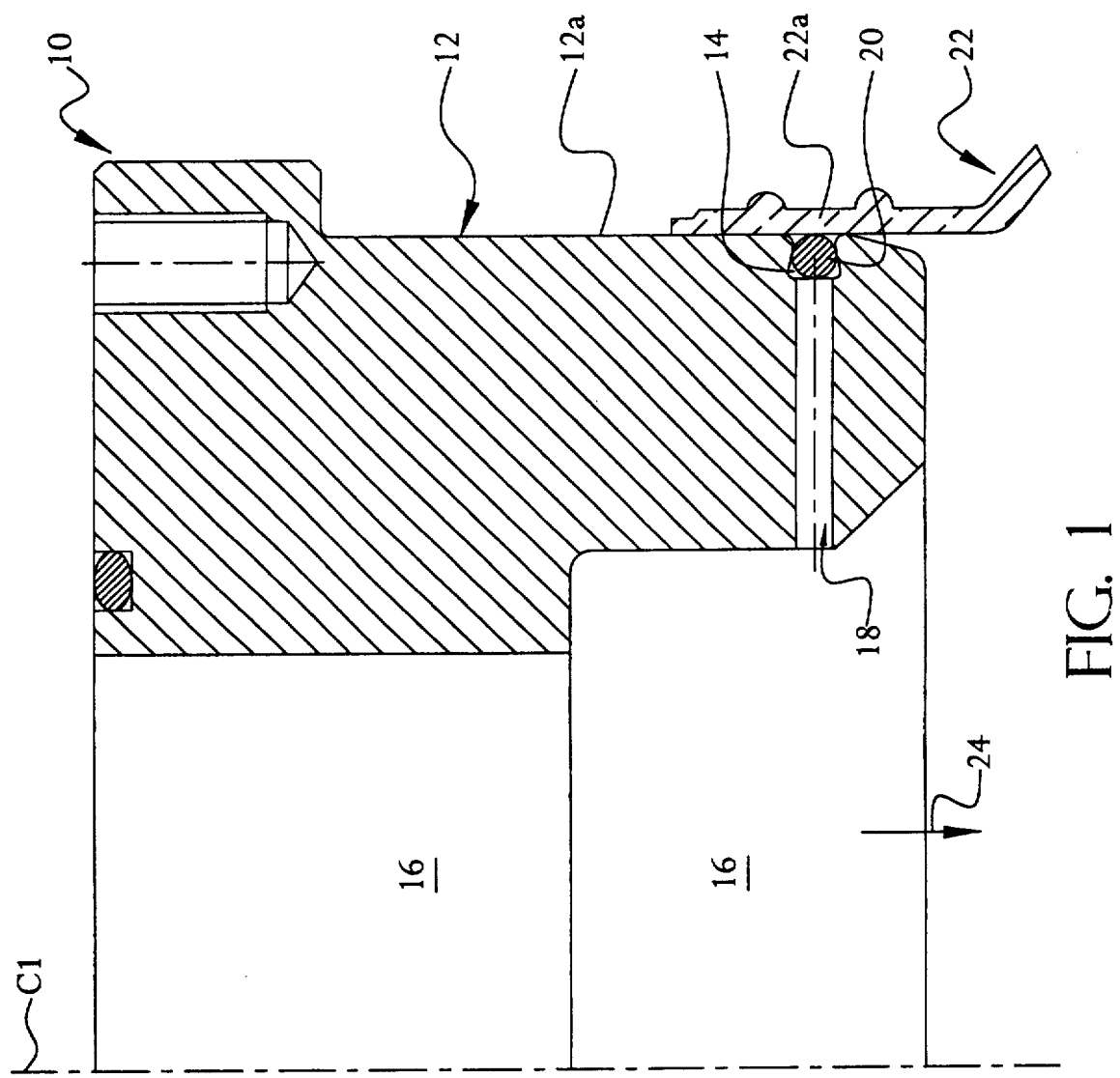
FIG. 1 is a cross-sectional view of a prior-art blow-pin assembly incorporating an elastic O-ring.

The invention is directed to a blow-pin assembly for use in forming hollow objects, such as containers, by the process of blow-molding. In particular, the blow-pin assembly is utilized to form hollow objects from thermoplastic parisons, i.e., preforms. The blow-pin assembly incorporates a seal assembly that is actuated by the pressurized air utilized to perform the blow-molding operation. The seal inhibits the leakage of air between the parison and the blow-pin assembly during blow-molding operations.

A presently-preferred embodiment of the invention is illustrated in FIGS. 2 through 9. The invention provides a blow-pin assembly 100. The blow-pin assembly 100 comprises a circular body 104, a ring member 106, an O-ring 108, and a seal band 110. The O-ring 108 and the seal band 110 form a seal assembly 111.

Figure 4:
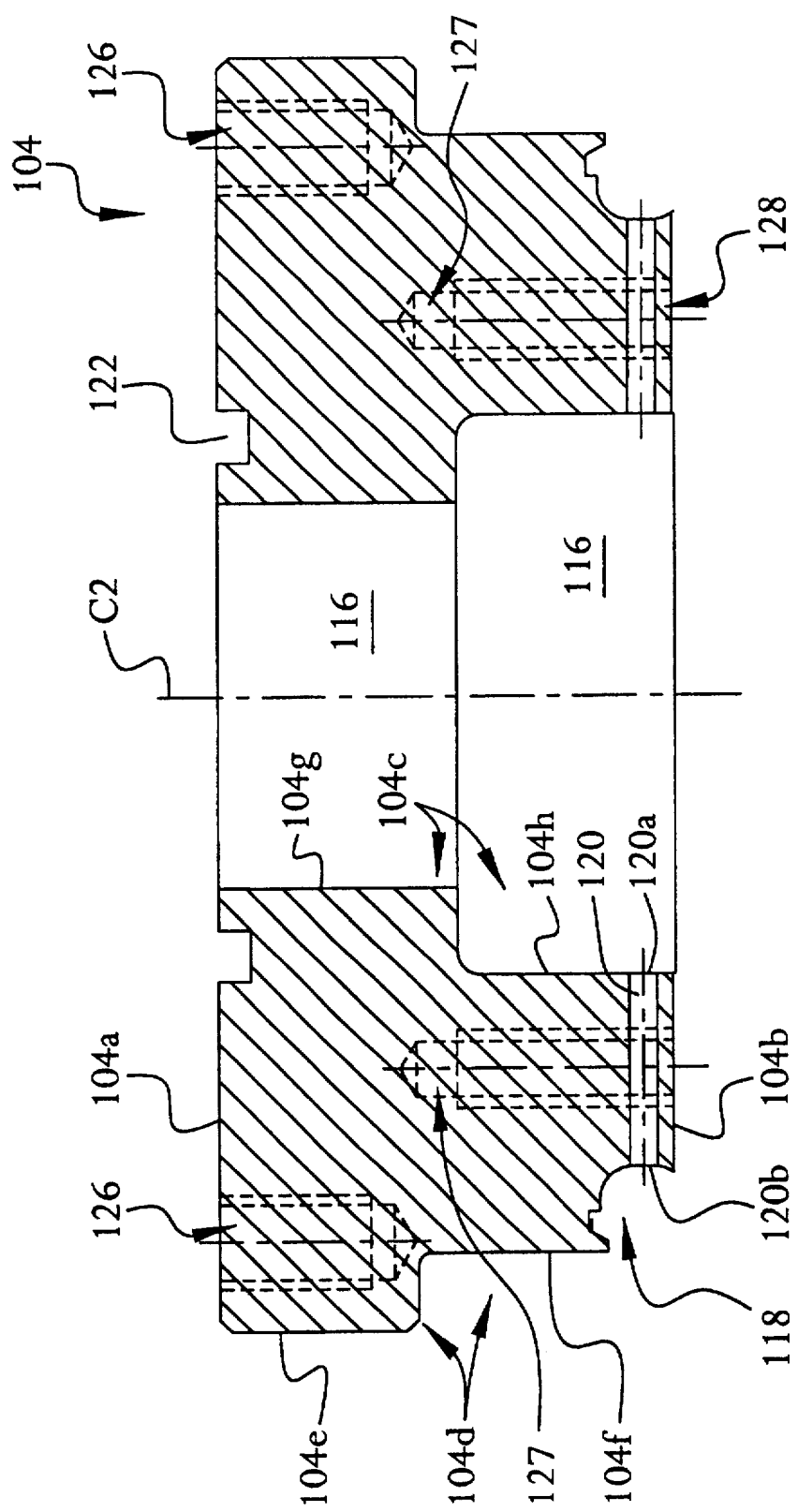
FIG. 4 is a view of the body portion of the blow-pin assembly shown in FIG. 2.

The body 104 is most clearly shown in FIG. 4. The body 104 is circumferentially disposed about a central axis C2 of the blow-pin assembly 100. The body 104 has a top surface 104a, an opposing bottom surface 104b, an inner circumferential surface 104c, and an outer circumferential surface 104d.

The outer circumferential surface 104d has an upper portion 104e and a lower portion 104f (see FIG. 4). The inner circumferential surface 104c has an upper portion 104g and a lower portion 104h. The surface portions 104g and 104h define a central passage 116. Pressurized air is supplied to the central passage 116 during blow-molding operations, as explained in detail below. (The terms "upper" and "lower," as used throughout the specification, reference the component orientations depicted in the figures. The terms are used for illustrative purposes only, and are not intended to be otherwise limiting.)

Figure 7:
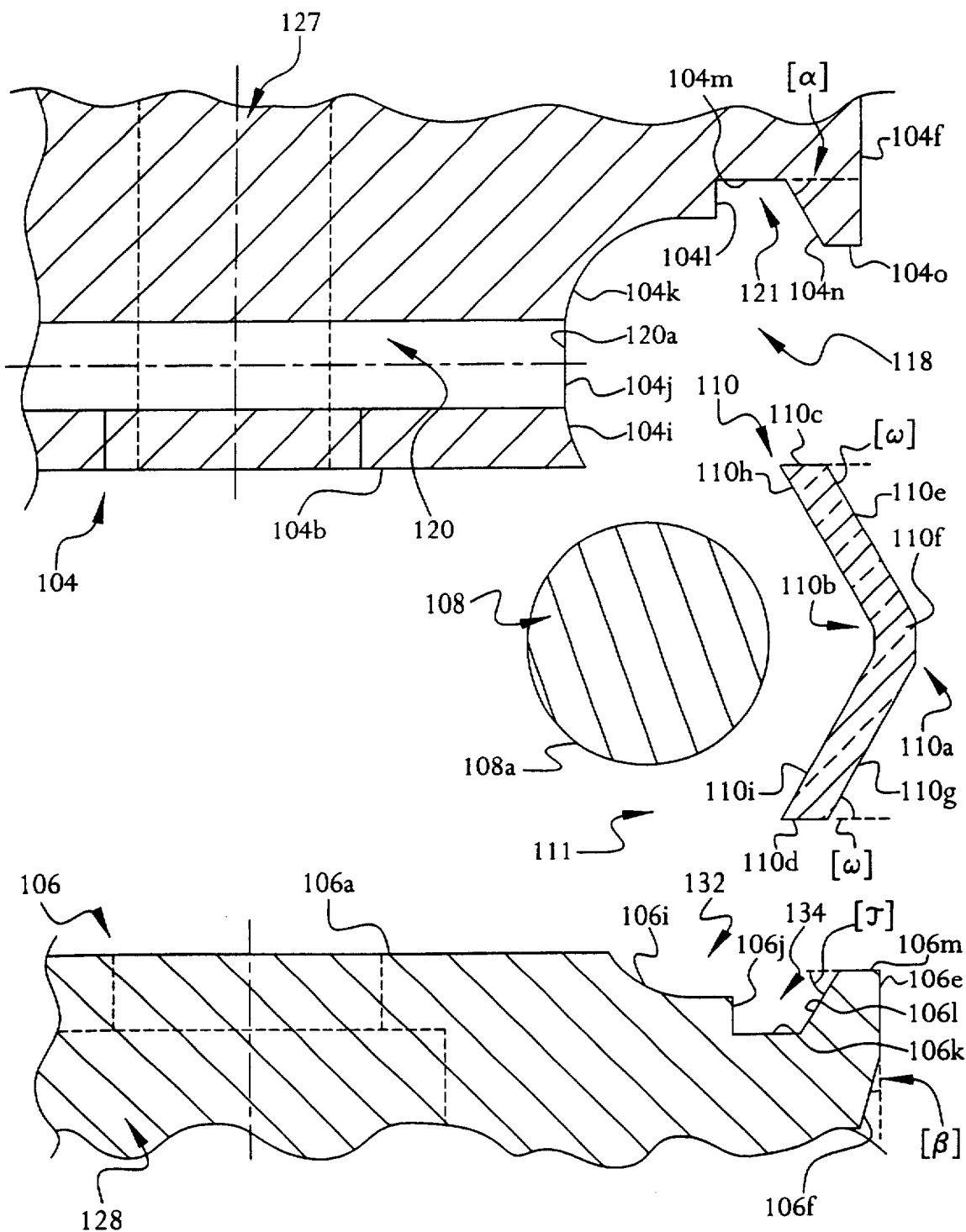
FIG. 7 is an exploded view of the sealing portion shown in FIG. 6.
Figure 8:
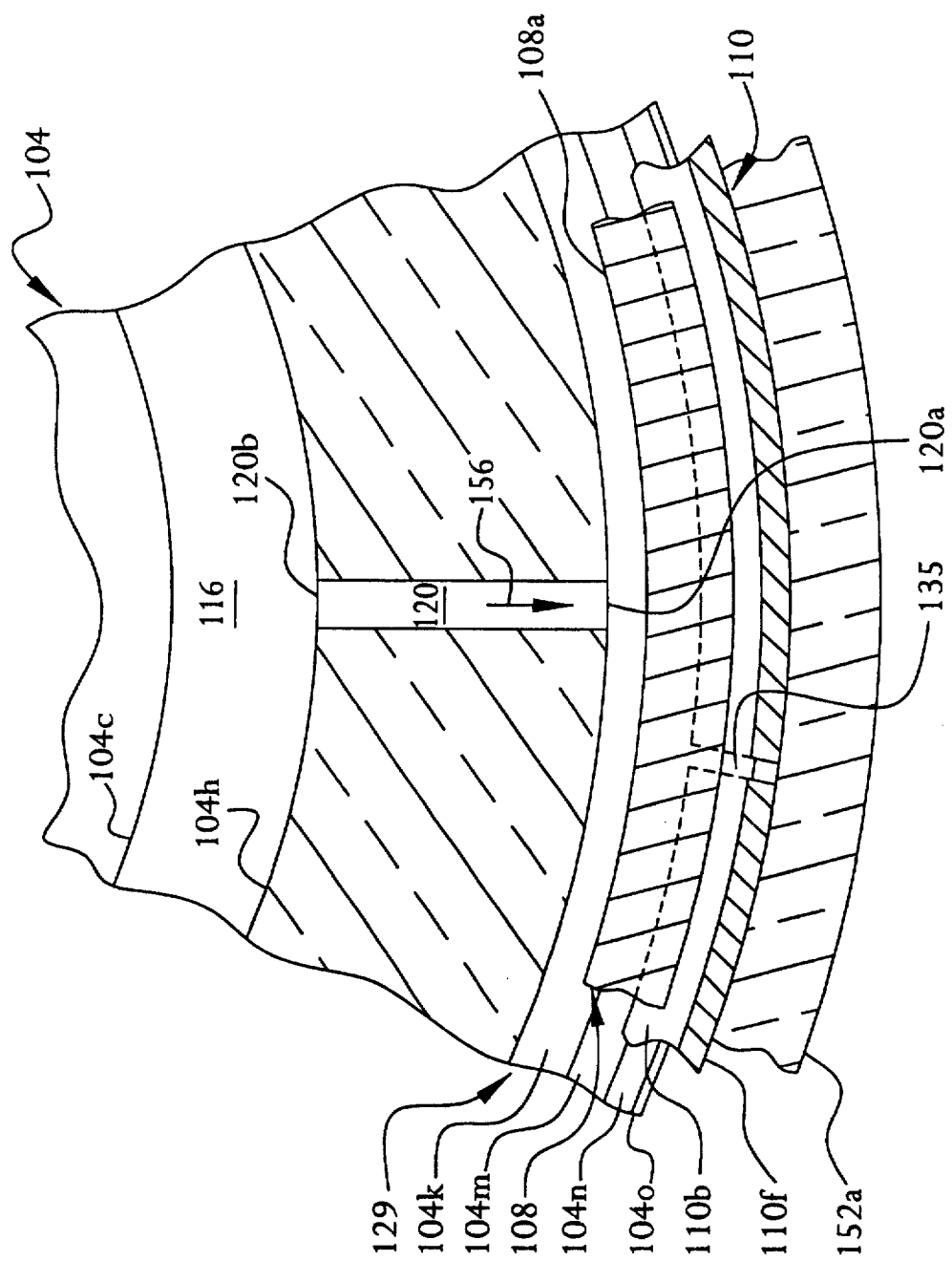
FIG. 8 is a view taken along the line 8—8 shown in FIG. 6.

The body 104 includes a circular recess 118 (see FIG. 7). The recess 118 is defined by a first curvilinear surface 104i, a first vertical surface 104j, and a second curvilinear surface 104k. The curvilinear surface 104i adjoins the bottom surface 104b. The vertical surface 104j adjoins the curvilinear surfaces 104i and 104k. (The terms "vertical" and "horizontal," as used throughout the specification, refer to orientations that are substantially parallel and perpendicular, respectively, to the central axis C2. The terms are used for illustrative purposes only, and are not intended to be otherwise limiting.)

The recess 118 is further defined by a second vertical surface 104l, a first horizontal surface 114m, an angled surface 114n, and a second horizontal surface 114o. The second vertical surface 104l adjoins the second curvilinear surface 104k. The first horizontal surface 104m adjoins the vertical surface 104l and the angled surface 104n. The second horizontal surface 104o adjoins the angled surface 104n and the lower portion 104f of the outer circumferential surface 104d. The angled surface 114n is oriented at an oblique angle in relation to a projection of the horizontal surface 104m. This angle is denoted by the symbol "α" in FIG. 7. Preferably, α is between about fifty and seventy degrees. Most preferably, α is about sixty degrees. The surfaces 104l, 104m, and 104n form a notch 121 within the recess 118. The significance of the notch 121 is discussed below.

The body 104 also includes a plurality of radially-oriented through holes 120. Preferably, the body 104 has about twelve through holes 120. Each through hole 120 is disposed between the central passage 116 and the recess 118. More particularly, the vertical surface 104j defines a first end 120a of each through hole 120, and the lower portion 104h of the inner circumferential surface 104c defines a second end 120b of each through hole 120. The through holes 120 thus place the central passage 116 and the recess 118 in fluid communication. The significance of this feature is explained in detail below.

Figure 2:
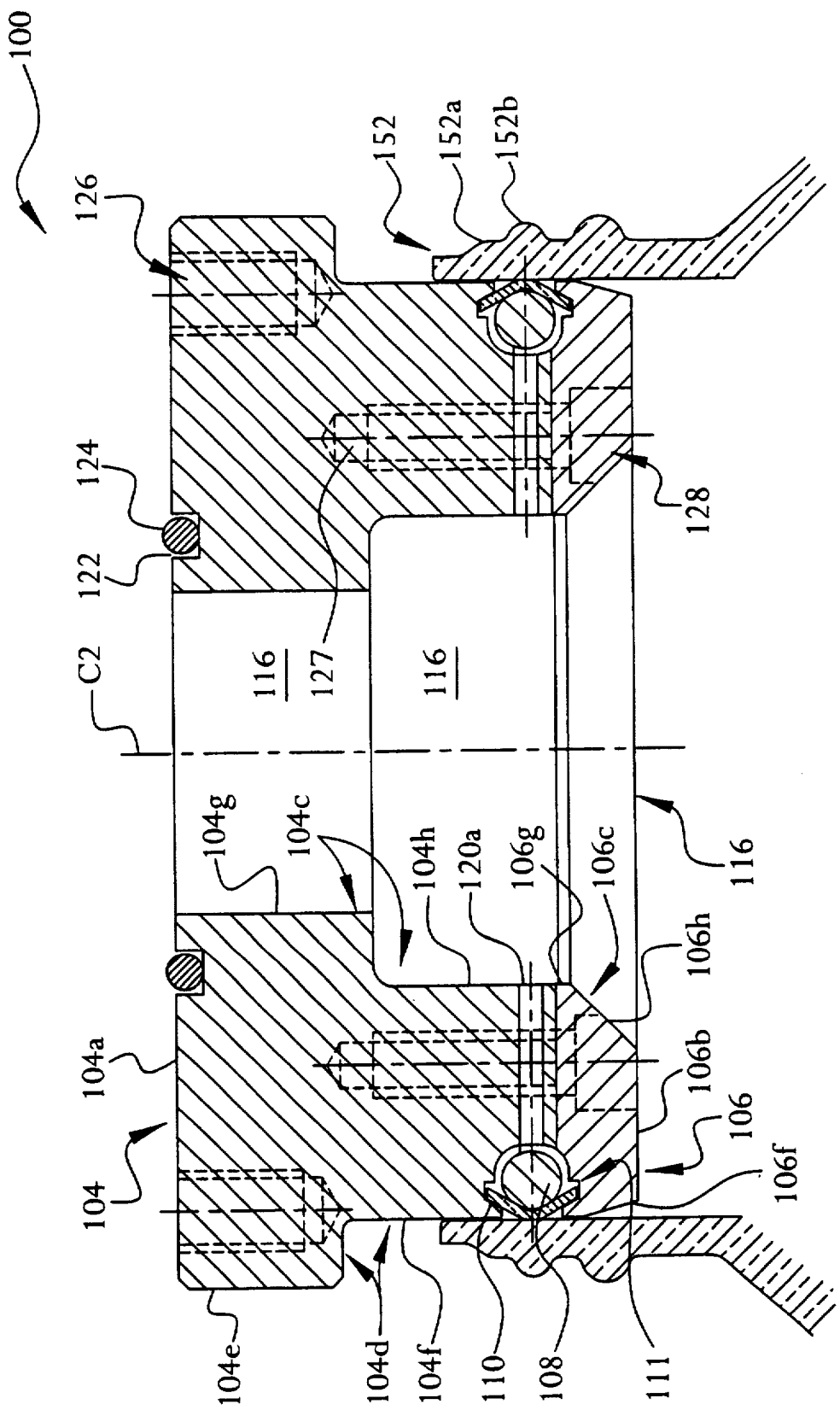
FIG. 2 is a cross-sectional view of a blow-pin assembly in accordance with the present invention.

The body 104 has a circular groove 122 disposed in the top surface 104a (see FIG. 4). The groove 122 accommodates a seal 124, as shown in FIG. 2. The body 104 also includes a plurality of threaded bores 126 and 127. The significance of the seal 124 and the bores 126 and 127 is discussed below.

Figure 5:
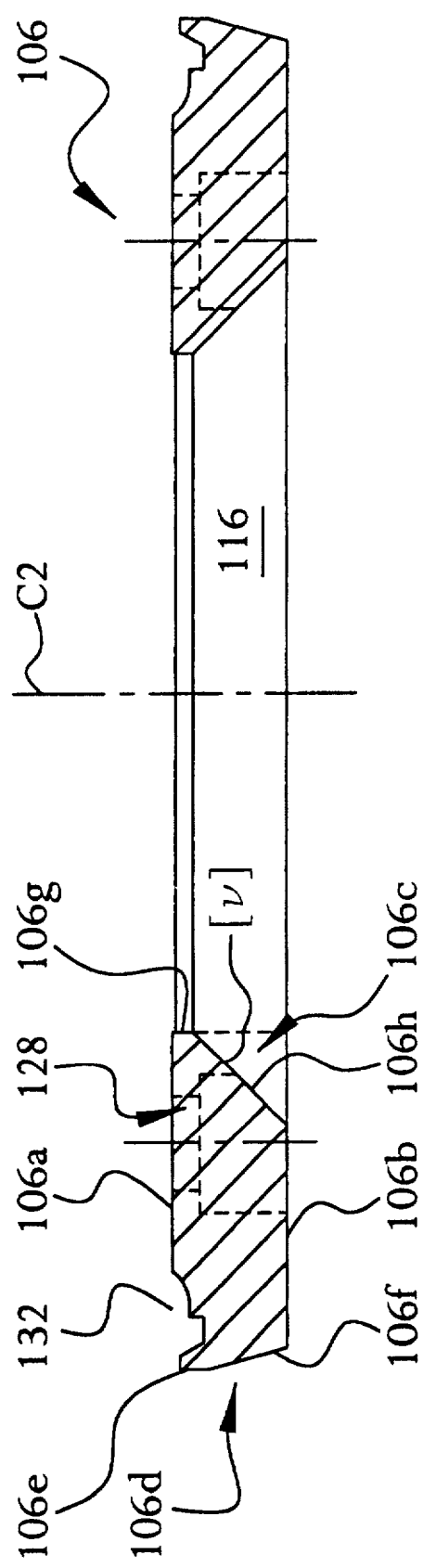
FIG. 5 is a view of the ring member portion of the blow-pin assembly shown in FIG. 2.

The ring member 106 is best shown in FIG. 5. (Although the ring member 106 is shown and described a separate part, the ring member 106 and the body 104 may, in the alternative, be unitarily formed.) The ring member 106 is circumferentially disposed about the central axis C2. The ring member 106 includes a top surface 106a, an opposing bottom surface 106b, an inner circumferential surface 106c, and an outer circumferential surface 106d.

The outer circumferential surface 106d has an upper portion 106e and an adjoining lower portion 106f. The lower portion 106f adjoins the bottom surface 106b. The upper portion 106e is substantially vertical. The lower portion 106f is oriented at an oblique angle in relation to a projection of the upper portion 106e. This angle is denoted by the symbol "β" in FIG. 7. Preferably, β is between about ten and twenty-five degrees. Most preferably, β is about fifteen degrees.

The inner circumferential surface 106c further defines the central passage 116. The surface 106c includes a lip 106g and an adjoining angled portion 106h. The lip 106g is oriented in a substantially vertical direction, and adjoins the top surface 106a. The lip 106g has a diameter about equal to the diameter of the lower portion 104h of the body inner circumferential surface 104c. The angled portion 106h is preferably disposed at an oblique angle in relation to the lip 106g. This angle is denoted by the symbol "ν" in FIG. 5. The optimal range of values for ν is dependent upon the geometry of the parison that the blow-pin assembly 100 is used in conjunction with. A typical range of values for ν is about thirty to fifty degrees.

The ring member 106 includes a circular recess 132 (see FIG. 7). The recess 132 is defined by a curvilinear surface 106i, a vertical surface 106j, a first horizontal surface 106k, an angled surface 106l, and a second horizontal surface 106m. The curvilinear surface 106i adjoins the top surface 106a. The first horizontal surface 106k adjoins the vertical surface 106j and the angled surface 106l. The second horizontal surface 106m adjoins the angled surface 106l and the upper portion 106e of the outer circumferential surface 106d. The angled surface 106l is oriented at an oblique angle in relation to a projection of the horizontal surface 106m. This angle is denoted by the symbol "τ" in FIG. 7. Preferably, τ is about equal to the above-noted angle α. The surfaces 106jl, 106k, and 106n form a notch 134 within the recess 132. The ring member 106 also includes a plurality of bores 128. The significance of the bores 128 is discussed below.

The O-ring 108 is formed from an elastic material, e.g., rubber. The O-ring 108 preferably has a substantially circular cross-section. The inner diameter of the O-ring 108 is about equal to, or slightly greater than, the diameter of the vertical surface 104j of the body 104.

The seal band 110 is most clearly shown in FIG. 7. The seal band 110 has an outboard edge 110a and an opposing inboard edge 110b. The seal band 110 also includes an upper edge 110c and an opposing lower edge 110d. The upper edge 110c and the lower edge 110d are substantially parallel.

The outboard edge 110a includes an upper portion 110e, an intermediate portion 110f, and a lower portion 110g. The upper portion 110e adjoins the upper edge 110c. The intermediate portion 110f adjoins the upper portion 110e and the lower portion 110g. The lower portion 110g adjoins the lower edge 110d. The intermediate portion 110f is substantially perpendicular to the upper and lower edges 110c and 110d. The upper portion 110e is disposed at an oblique angle in relation to a projection of the upper edge 110c. The lower portion 110g is disposed at a substantially identical angle in relation to the lower edge 110d. These angles are denoted by the symbol "ω" in FIG. 7. Preferably, ω is about equal to the above-noted angle α. Hence, the geometric profiles of the surface portions 110e and 110g are substantially identical to those of the body surface 104n and the ring member surface 106l, respectively.

The inboard edge 110b includes an upper portion 110h and an adjoining lower portion 110i. The upper portion 110h adjoins the upper edge 110c. The lower portion 110i adjoins the lower edge 110d. The upper portion 110h and the lower portion 110i are substantially parallel to the upper portion 110e and the lower portion 110g, respectively, of the outboard edge 110a. Hence, the seal band 110 has a substantially V-shaped cross section, as shown in the figures.

Figure 3:
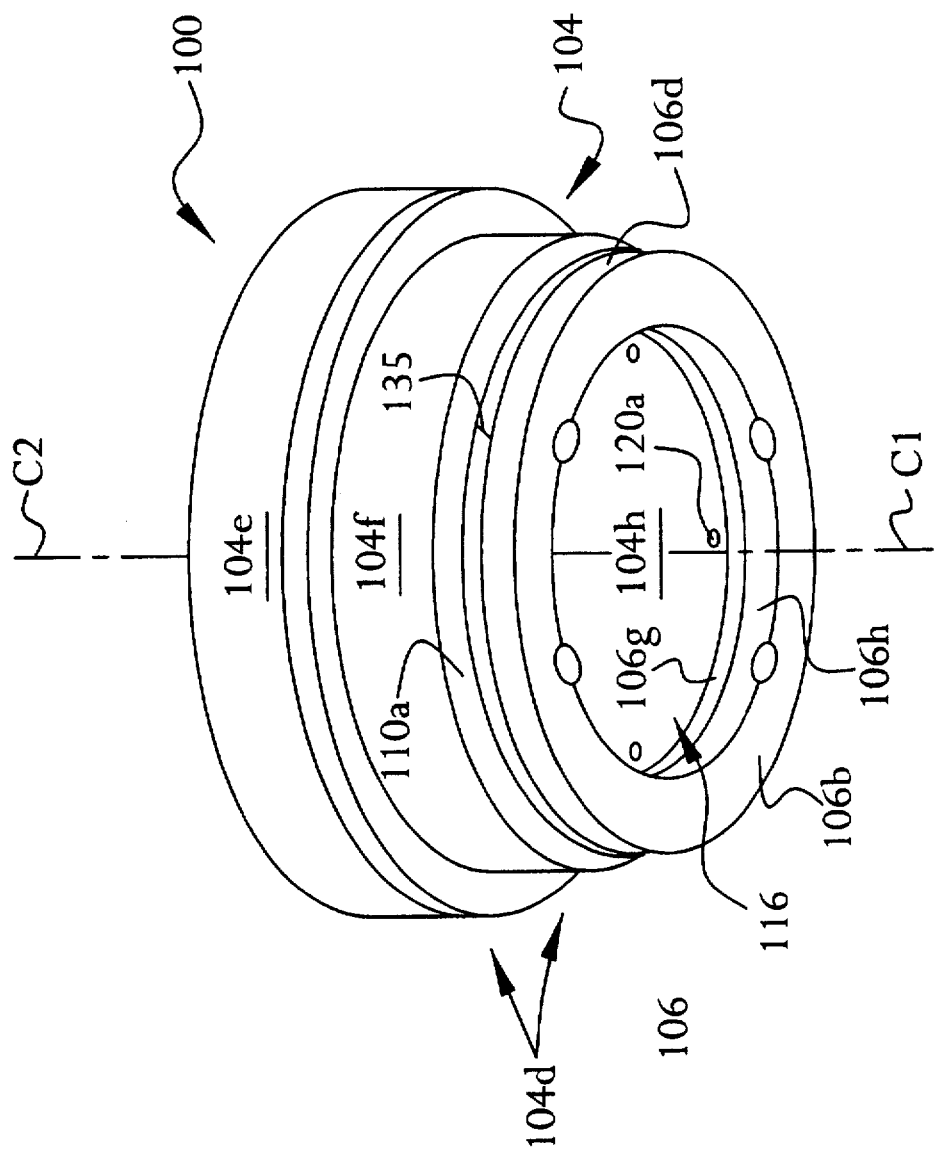
FIG. 3 is a bottom perspective view of the blow-pin assembly shown in FIG. 2.

The seal band 110 is formed from a durable material, i.e., from a material having a high degree of abrasion resistance in comparison to a typical thermoplastic parison. Preferably, the seal band 110 is formed from a material having a hardness comparable to or greater than that of a relatively soft metal such as brass, i.e., the seal band 110 preferably has a Brinell hardness number about equal to or greater than 100. Most preferably, the seal band is formed from a stainless steel, e.g., 301 stainless steel. The seal band 110 has one split line 135 (see FIGS. 3 and 8). Preferably, the split line 135 is oriented at an angle of about forty-five degrees in relation to the central axis C2, as shown in FIG. 3. Furthermore, the split line 135 is preferably angled outward, i.e., away from the central axis C2, thereby giving the split line 135 a beveled configuration.

The blow-pin assembly 100 is illustrated in its assembled state in FIGS. 2, 3, 6, and 8. As shown in the figures, the body 104 is coupled to the ring member 106. More particularly, the bottom surface 104b of the body 104 abuts the upper surface 106a of the ring member 106. The ring member 106 is secured to the body 104 by a plurality of threaded fasteners (not shown) inserted in the bores 127 and 128. Alternative fastening means, e.g., latches, can also be utilized to couple the body 104 and the ring member 106.

The recess 118 of the body 104 and the recess 132 of the ring member 106 substantially align when the body 104 and the ring member 106 are coupled in the above-described manner. The recesses 118 and 132 form a circular groove 129 when so aligned (see FIG. 6). The groove 129 receives the O-ring 108 and the seal band 110. In particular, a portion of the seal band 110 proximate the upper edge 110c is disposed within the notch 121. A portion of the seal band 110 proximate the lower edge 110d is likewise disposed within the notch 134. The O-ring 108 is disposed inboard of the seal band 110, i.e., the O-ring 108 is located between the seal band 110 and the through holes 120. Hence, the inboard edge 110b of the seal band 110 circumscribes the O-ring 108. The cross-sectional diameter of the O-ring 108 is such that the O-ring 108 can move both vertically and horizontally within the groove 129, within the constraints imposed by the surrounding portions of the body 104, the ring member 106, and the seal band 110. Furthermore, the seal band 110 is sized such that the seal band 110 can undergo a limited degree of vertical and horizontal movement in relation to the notches 121 and 134.

The blow-pin assembly 100 is utilized as part of a blow-molding apparatus 136. The blow molding apparatus 136 is described for illustrative purposes only, as the blow-pin assembly 100 can be incorporated into other types of blow-molding apparatuses. The blow-molding apparatus 136 is illustrated diagrammatically in FIG. 9. For clarity, a limited portion of the blow-molding apparatus 136 is shown in the figure.

The blow-molding apparatus 136 includes a vertically-split, two-piece mold 138. The mold 138 comprises a first half 138a and a second half 138b. The first half 138a includes an inner surface 138c. The second half 138b includes an inner surface 138d. The inner surfaces 138c and 138d define a cavity 140 when the mold halves 138a and 138b are joined as shown in FIG. 9.

The inner surface 138c of the mold 136 includes a threaded portion 138e. The threaded portion 138e is disposed in a substantially vertical orientation, and forms the uppermost section of the inner surface 138c. The inner surface 138d likewise includes a threaded portion 138f. The threaded portion 138f is also disposed in a substantially vertical orientation, and forms the uppermost section of the inner surface 138d. The threaded portions 138e and 138f oppose the lower portion 104f of the outer circumferential surface 104d on the body 104. The threaded portions 138e and 138f also oppose the upper portion 106e and the lower portion 106f of the outer circumferential surface 106d on the ring member 106.

Figure 9:
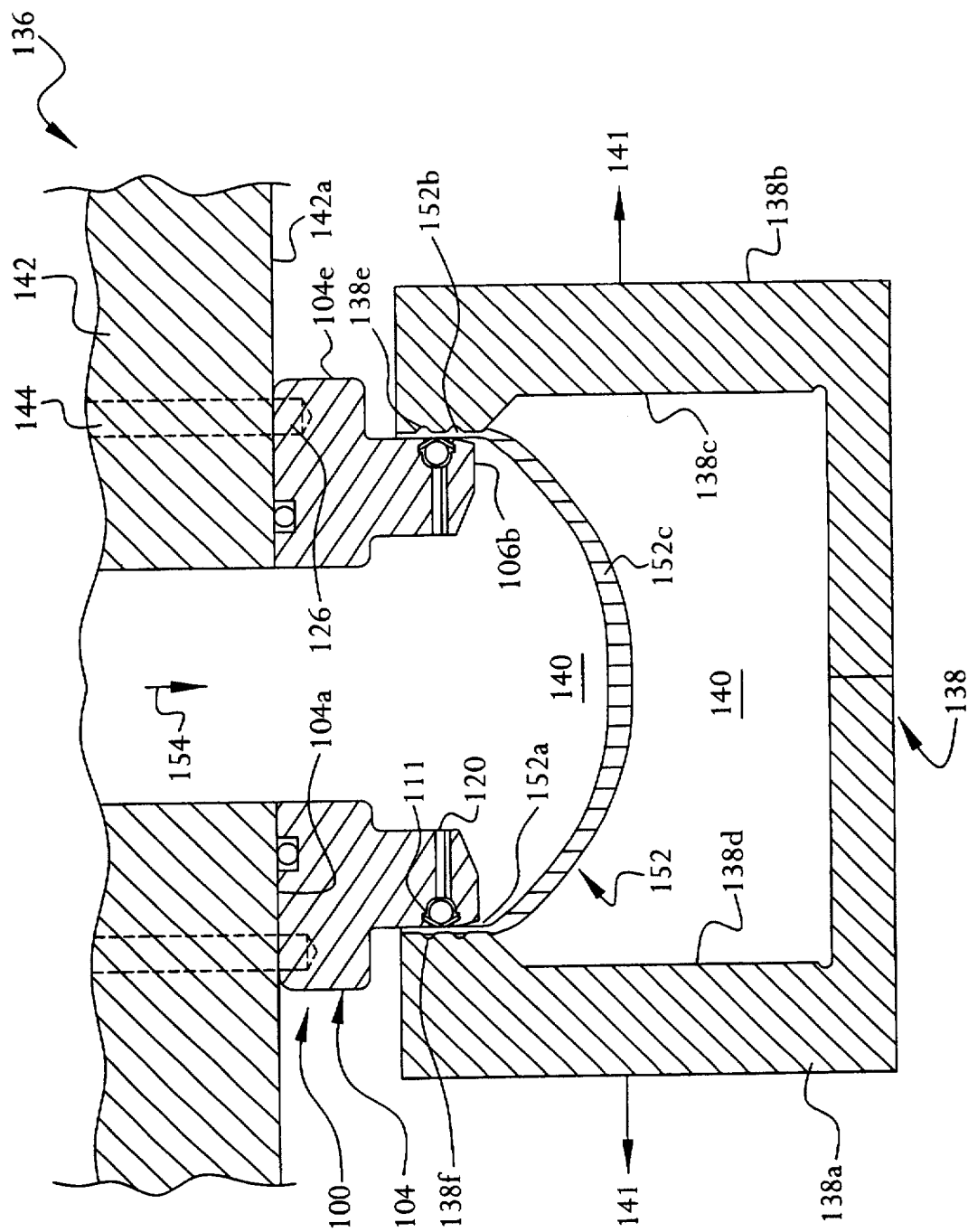
FIG. 9 is a view of a blow-molding apparatus incorporating the blow-pin assembly shown in FIG. 2.

The mold 138 is shown in its closed position in FIG. 9. The mold halves 138a and 138b each translate outward, i.e., away from the central axis C2, into an open position. The direction of translation is indicated by the arrows 141 in FIG. 9. For clarity, a means for effectuating the translation is not shown, and the mold 138 is shown in its closed position only.

The blow-pin assembly 100 is coupled to a supporting member 142. More particularly, the top surface 104a of the body 104 abuts a surface 142a of the supporting member 142. The supporting member 142 is secured to the blow-molding apparatus 136 by a plurality of threaded fasteners (not shown). Alternative fastening means, e.g., latches, can also be utilized to couple the blow-pin assembly 100 and the supporting member 142.

The blow-molding apparatus 136 is used in conjunction with a parison 152. More particularly, the apparatus 136 forms a hollow plastic container from the parison 152. The parison 152 includes a substantially circular neck portion 152a. The neck portion 152a has an inner diameter about equal to the diameters of the upper portion 106e of the ring-member surface 106d and the lower portion 104e of the body surface 104f. A series of threads 152b are disposed along an outer circumference of the neck portion 152a. The pattern of the threads 152b matches the pattern of the threads disposed in the threaded portions 138e and 138f of mold halves 138a and 138b. The parison 152 has an arcuate portion that adjoins the neck portion 152a, as shown in FIG. 9.

The parison 152 is placed on the blow-pin assembly 100 when the mold 138 is in its open position. More particularly, the parison 152 is positioned so that an inner circumference of the neck portion 152a engages the surface portions 106e and 104f of the blow-pin assembly 100. The mold halves 138a and 138b are subsequently moved inward, until the mold 138 assumes its closed position. More specifically, the mold halves 138a and 138b are moved inward until the threaded portions 138e and 138f abut an outer circumference of the neck portion 152a. This arrangement restrains the parison 152 laterally. Furthermore, the threaded portions 138e and 138f engage the parison threads 152b when the mold 138 is closed. This engagement restrains the parison 152 vertically.

Blow-molding operations are conducted by directing pressurized air into the cavity 140 once the parison 152 is positioned as described above. More particularly, pressurized blow air is routed through the central passage 116 and into the upper portion of the cavity 140, in the direction denoted by the arrow 154 in FIG. 9. The blow air actuates the seal assembly 111, as explained in detail below. The seal assembly 111, once actuated, inhibits leakage of blow air between the parison neck portion 152a and the blow-pin assembly 100. Hence, the portion of the cavity 140 located above the arcuate portion 152c of the parison 152 becomes pressurized in response to the discharge of pressurized blow air from the central passage 116.

Pressurization of the noted portion of the cavity 140 causes the parison 152 to deform. More particularly, the pressure differential across the arcuate portion 152c causes the parison 152 to expand. The parison 152 expands until it contacts the inner surfaces 138c and 138d of the mold 138. The pressure within the cavity 104, in conjunction with the restraining effect of the inner surfaces 138c and 138d, causes the parison 152 to assume the shape of the inner surfaces 138c and 138d. Hence, the blow-molding process results in a hollow container having the shape of the inner surfaces 138c and 138d.

Figure 6:
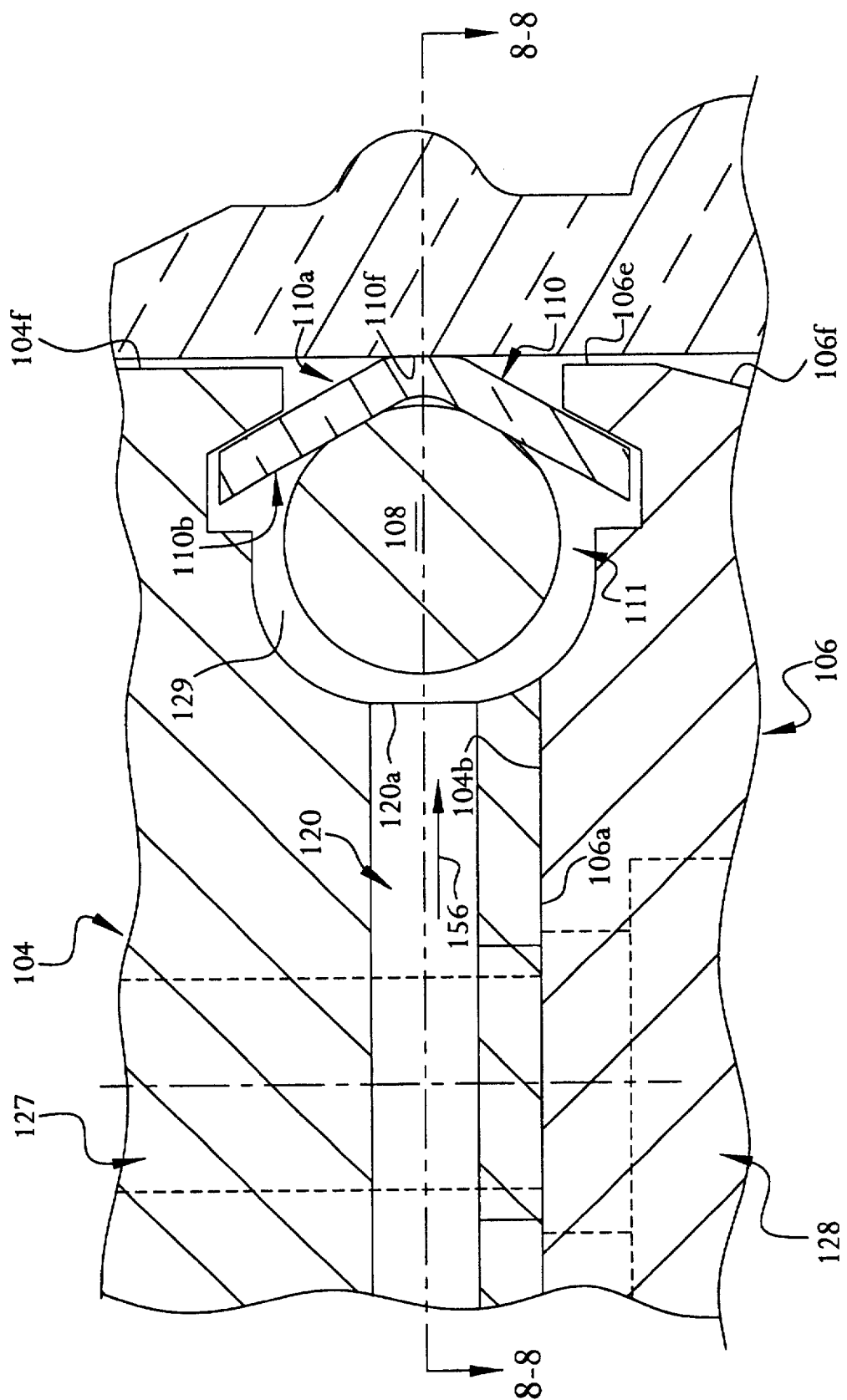
FIG. 6 is a detailed view of the sealing portion of the blow-pin assembly shown in FIG. 2.

Details concerning the operation of the seal assembly 111 are best explained with reference to FIG. 6. The seal assembly 111 is actuated by the pressurized air used to expand the parison 152, as noted above. The pressurized air reaches the seal assembly 111 by way of the through holes 120, as denoted by the arrows 156 in FIGS. 6 and 8. In particular, the ends 120b of the through holes 120 are in fluid communication with the cavity 140 (see FIG. 9). Pressurized air from the cavity 140 enters the ends 120b and is subsequently discharged into the recess 118 by way of the ends 120a, thereby pressurizing the groove 129.

Pressurization of the groove 129 urges the O-ring 108 and the seal band 110 outward, i.e., away from the central axis C2. Specifically, the inboard edge 110b of the seal band 110 is exposed to the pressurized air within the groove 129. The outboard edge 110a of the band 110 is subject to a lower pressure, because pressurized air does not act directly on the outboard edge 110a. The resulting pressure differential urges the seal band 110 outward, until the intermediate portion 110f of the band 110 contacts the inner circumference of the parison neck portion 152b (the split line incorporated into the seal band 110 permits the seal band 100 to expand as it is urged outward). The contact between the intermediate portion 110f and the parison 152 inhibits leakage of pressurized air between the parison 152a and the blow-pin assembly 100, thereby sealing the cavity 140.

The outward movement of the seal band 110 also urges the body surface 104n and the ring member surface 106l into contact with the upper and lower surface portions 110e and 110f, respectively, of the seal band 110. The substantially identical geometric profiles of the contacting surfaces, combined with the outward force generated by the pressurized air, inhibits leakage of pressurized air from the groove 129. Furthermore, the angled orientations of the body surface 104n, the ring member surface 106l, and the upper and lower surface portions 110e and 110f of the seal band 110 cause the seal band 110 to remain substantially centered with respect to a vertical centerline of the groove 129. In other words, the geometric configuration of the seal band 110 and the notches 121 and 134 cause the seal band 110 to be self aligning with respect to the groove 129. This feature enhances the sealing effectiveness of the seal band 110 by ensuring that the seal band 110 is properly seated during blow-molding operations.

The O-ring 108 is also urged outward by the pressurized air within the groove 129, as noted above. In particular, the O-ring 108 is urged outward until the O-ring 108 contacts the inboard edge 110b of the seal band 110. The O-ring 108 thus covers the split line in the seal band 110, thereby inhibiting leakage of pressurized air past the split line.

The flow of pressurized air into the cavity 140 is ceased when blow-molding operations have been concluded, i.e., when the parison 152 has been formed into a hollow container in the above-described manner. The loss of cavity pressurization deactivates the seal assembly 111, substantially reducing the contact force between the seal band 110 and the newly-formed container. The container is subsequently removed from the blow-molding apparatus 136 after the mold halves 138a and 138b have been moved to their open positions.

The seal assembly 111 provides significant advantages in relation to commonly-used blow-pin seals. For example, the seal band 110 is substantially more durable than common rubber seals. Hence, the seal band 110 has a potentially greater life cycle than such seals. This characteristic enhances the reliability of the blow-pin assembly 100. Furthermore, the replacement interval for the seal band 110 is potentially greater than that of common seals, thereby reducing operating costs and production interruptions. In addition, the enhanced durability of the seal band 110 causes the sealing effectiveness of the seal band 110 to remain substantially constant over the life of the seal band 110. Common rubber seals, in contrast, typically experience chafing during their life cycle. This chafing reduces sealing effectiveness, and can thereby lead to quality control problems caused by insufficient air pressure within the blow mold.

Figure 10:
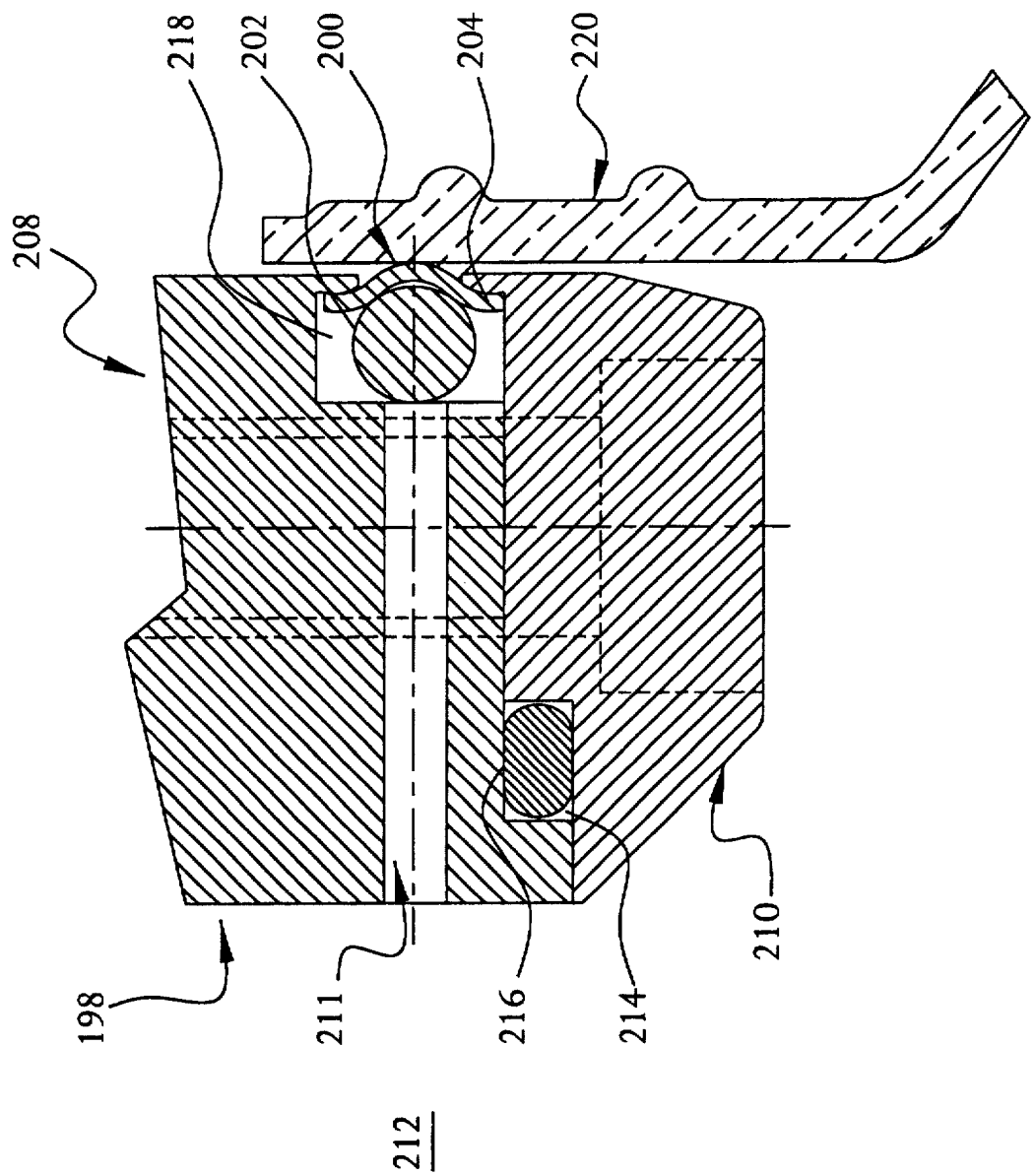
FIG. 10 is a detailed view of an alternative embodiment of the sealing portion of the blow-pin assembly shown in FIG. 2.
Figure 11:
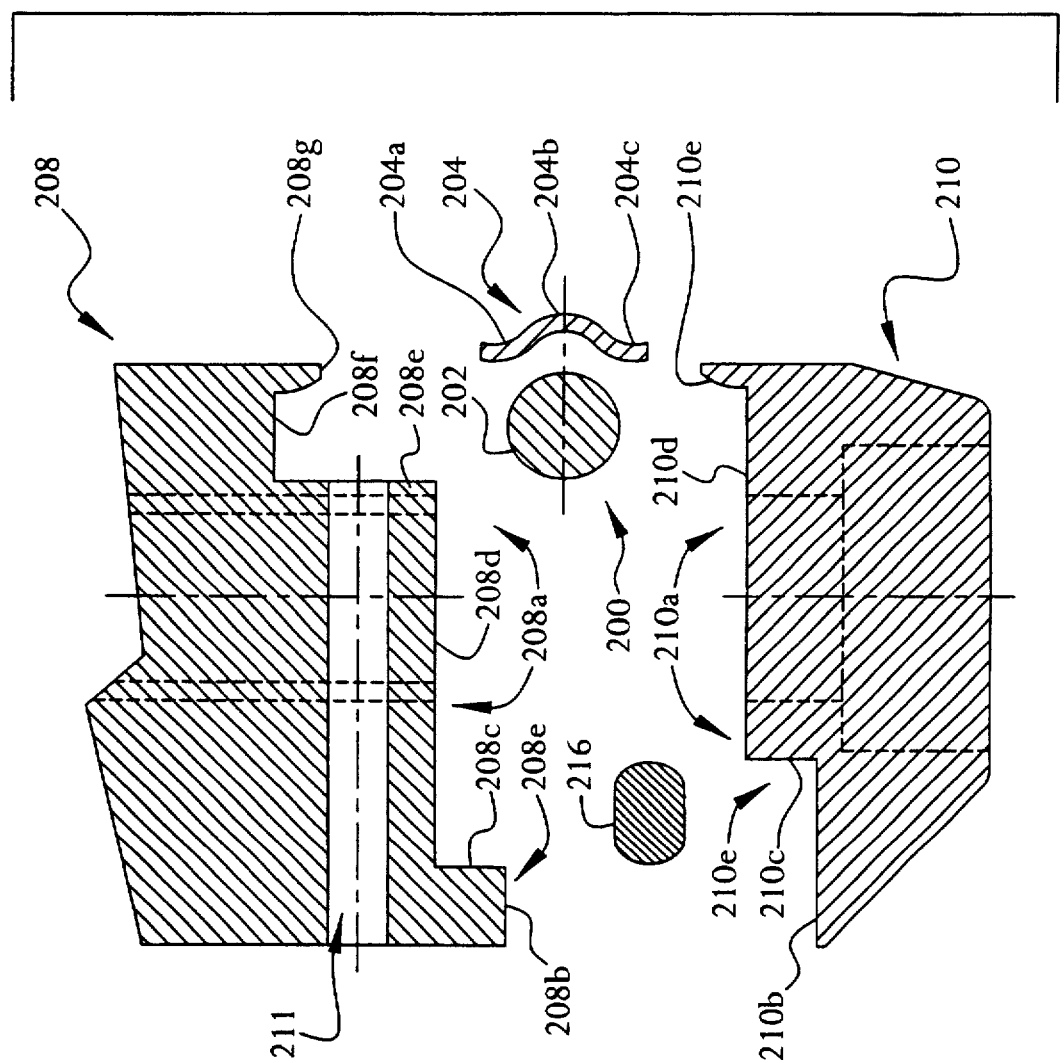
FIG. 11 an exploded view of the sealing portion shown in FIG. 10.

Various alternative embodiments the blow-pin assembly 100 and the seal assembly 111 are shown in FIGS. 10 through 23. FIGS. 10 and 11 illustrate a blow-pin assembly 198. The physical and functional characteristics the blow-pin assembly 198 are substantially identical to those of the blow-pin assembly 100, with the following exceptions.

The blow-pin assembly 198 includes a seal assembly 200. The seal assembly 200 includes an O-ring 202 and a seal band 204. The O-ring 202 preferably has a substantially circular cross section. The seal band 204 includes an upper portion 204a, an intermediate portion 204b, and a lower portion 204c (see FIG. 11). The seal band 204 has a substantially convex cross-section. Preferably, the curvature of the intermediate portion 204b is about equal to the curvature of an outer circumference of the O-ring 202. The seal band 204 has one split line.

The blow-pin assembly 198 also includes a circular body 208 and a ring member 210. The body 208 has a plurality of through-holes 211. The body 208 and the ring member 210 define a central passage 212. The body 208 has a bottom surface 208a, as is most clearly shown in FIG. 11. The bottom surface comprises a first horizontal portion 208b, a first vertical portion 208c, and a second horizontal portion 208d. The ring member 210 has an upper surface 210a. The upper surface 210a comprises a first horizontal portion 210b, a first vertical portion 210c, and a second horizontal portion 210d.

The body 208 and the ring member 210 are coupled by way of the surfaces 208a and 210a. More particularly, the first horizontal surface 208b abuts the first horizontal surface 210b, and the second horizontal surface 208d abuts the second horizontal surface 210d when the body 208 and the ring member 210 are coupled. The surface portions 208c, 208d, 210b, and 210c define a circumferential cavity 214 when the body 208 and the ring member 210 are joined in the noted manner (see FIG. 10). An O-ring 216 is disposed within the cavity 214. The O-ring 216 preferably has a circular cross section. This arrangement inhibits leakage of pressurized air from the central passage 212 during blow-molding operations.

The bottom surface 208a of the body 208 further includes a second vertical portion 208e, a third horizontal portion 208f, and an arcuate portion 208g. The bottom surface 210a of the ring member 210 includes an arcuate portion 210e. The surface portions 208e, 208f, 208g, and 210e form a circumferential groove 218 when the body 208 and the ring member 210 are coupled in the above-described manner (see FIG. 10).

The groove 218 receives the O-ring 202 and the seal band 204. The O-ring 202 and the seal band 204 function in a manner similar to the O-ring 108 and the seal band 110 of the blow-pin assembly 100. In particular, pressurized air is directed from the passage 212 to the groove 218 by way of the through holes 211. The pressurized air urges the seal band 204 outward. The seal band 204 contacts a parison 220 positioned along the exterior of the blow-pin assembly 198, thereby inhibiting leakage of air between the parison 220 and the blow-pin assembly 198. Furthermore, the upper and lower portions 204a and 204c of the seal band 204 abut the arcuate portions 208g and 210e, respectively, of the body 208 and the ring member 210. This contact restrains the seal band 204, and substantially aligns the seal band 204 with a vertical centerline of the groove 218. The pressurized air also urges the O-ring 202 outward, into the seal band 204. The O-ring 202 thus covers the split line in the seal band 204, thereby inhibiting leakage of pressurized air through the split line.

Figure 12:
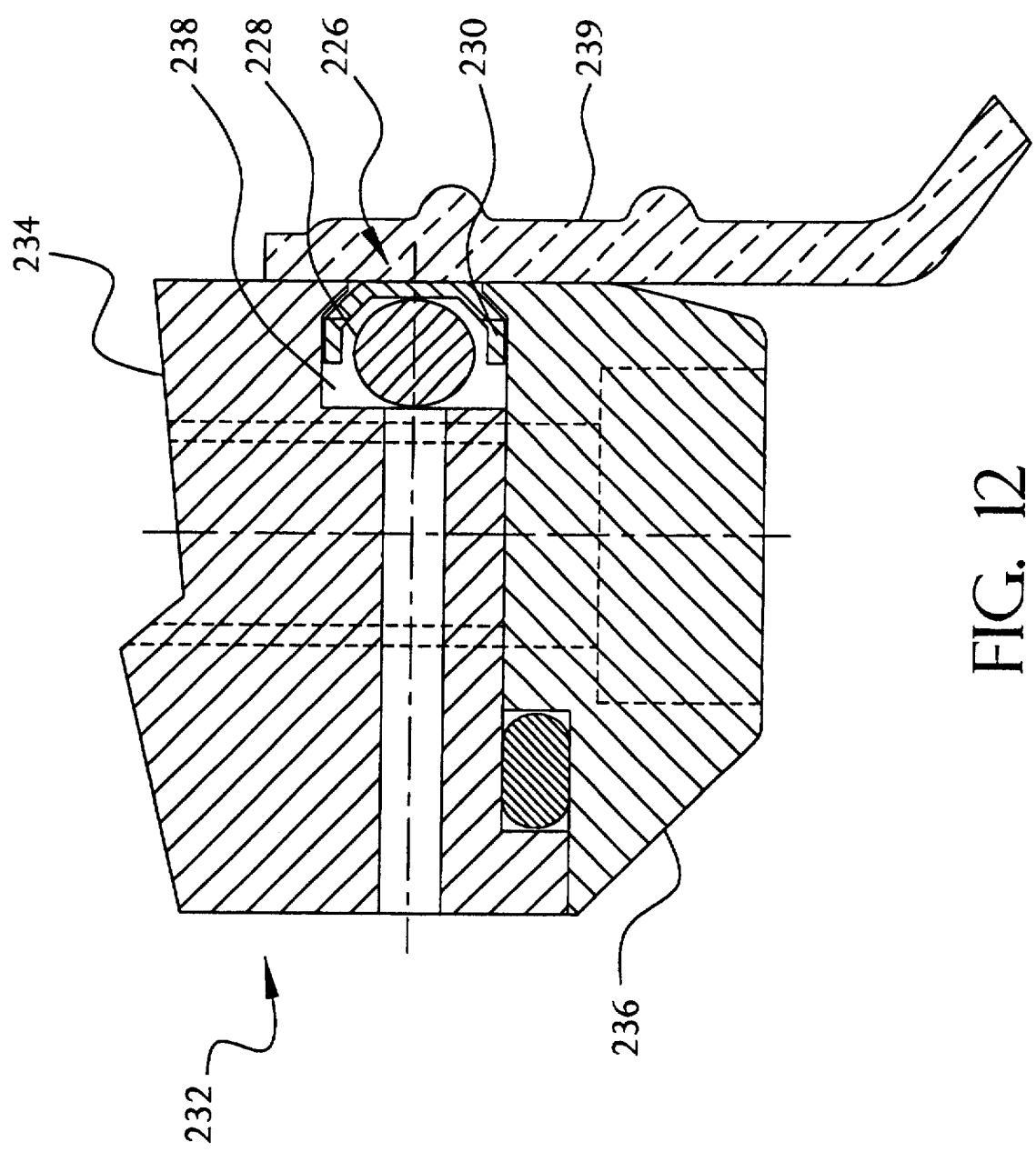
FIG. 12 is a detailed view of an alternative embodiment of the sealing portion of the blow-pin assembly shown in FIG. 2.
Figure 13:
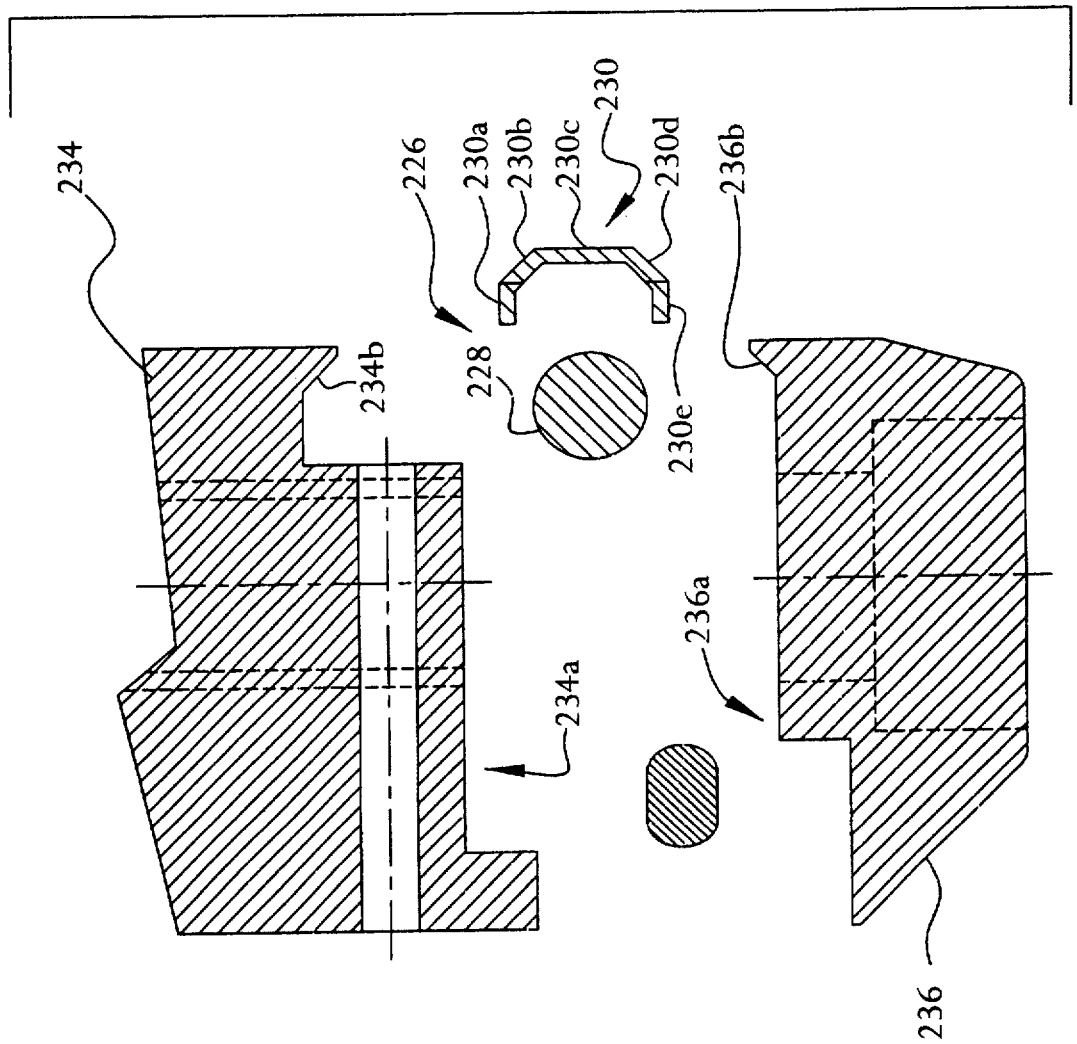
FIG. 13 an exploded view of the sealing portion shown in FIG. 12.

FIGS. 12 and 13 illustrate another alternative embodiment of the invention. This embodiment comprises a seal assembly 226. The seal assembly 226 includes an O-ring 228 and a seal band 230. The O-ring 228 preferably has a substantially circular cross-section. The seal assembly 226 is part of a blow-pin assembly 232. The blow-pin assembly 232 also includes a circular body 234 and a ring member 236. The body 234 has a bottom surface 234a, and the ring member 236 includes a top surface 236a. The body 234 and the ring member 236 are coupled by way of the bottom surface 234a and the top surface 236a. The bottom surface 234a and top surface 236a define a circular groove 238 (see FIG. 12). The groove 238 receives the O-ring 228 and the seal band 230. The physical and functional characteristics the blow-pin assembly 232 are substantially identical to those of the blow-pin assembly 198, with the exception of the seal band 230 and the groove 238.

The seal band 230 includes a first horizontal portion 230a, a first angled portion 230b, and a vertical portion 230c (see FIG. 13). The seal band 230 also includes a second angled portion 230d and a second horizontal portion 230e. This configuration give the seal band 230 a U-shaped profile. The seal band 230 has one split line.

The bottom surface 234a of the body 234 has an angled portion 234b (see FIG. 13). The orientation of the angled portion 234b substantially matches the orientation of the angled portion 230b of the seal band 230 when the seal band 230 is disposed within the groove 238. The upper surface 236a of the ring member 236 has an angled portion 236b. The orientation of the angled portion 236b substantially matches the orientation of the angled portion 230d of the seal band 230 when the seal band 230 is disposed within the groove 238.

The O-ring 228 and the seal band 230 function in a manner similar to the O-ring 108 and the seal band 110 of the blow-pin assembly 100. In particular, the groove 238 is pressurized by the air used in the blow-molding process. Pressurization of the groove 238 urges the seal band 230 outward. The seal band 230 contacts a parison 239 positioned along the exterior of the blow-pin assembly 232, thereby inhibiting leakage of air between the parison 239 and the blow-pin assembly 232. Furthermore, the angled portions 230b and 230d of the seal band 230 abut the angled portions 234b and 236b, respectively, of the body 234 and the ring member 236. This contact restrains the seal band 230, and substantially aligns the seal band 230 with a vertical centerline of the groove 238. The pressurized air also urges the O-ring 228 outward, into the seal band 230. The O-ring 228 thus covers the split line in the seal band 230, thereby inhibiting leakage of pressurized air through the split line.

Figure 14:
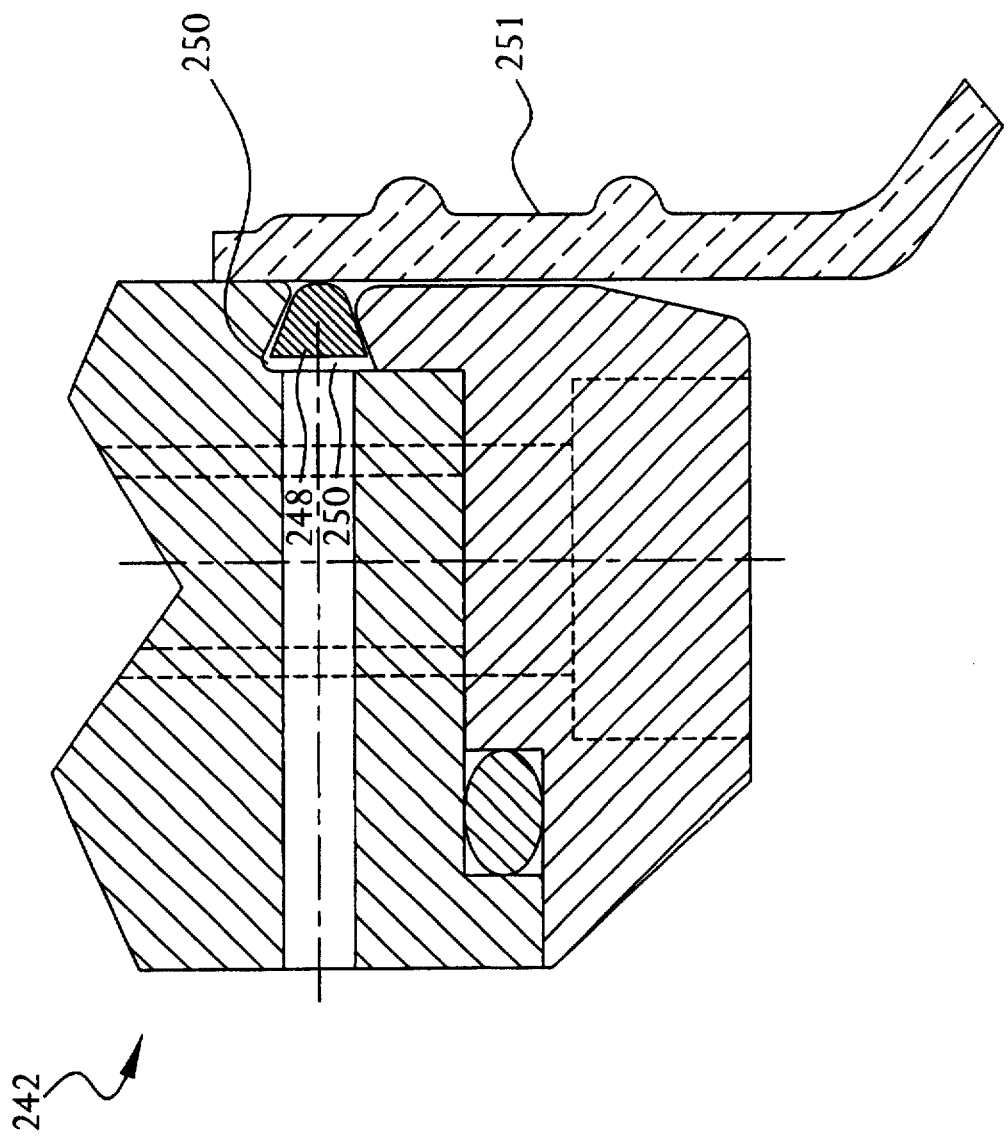
FIG. 14 is a detailed view of an alternative embodiment of the sealing portion of the blow-pin assembly shown in FIG. 2.
Figure 15:
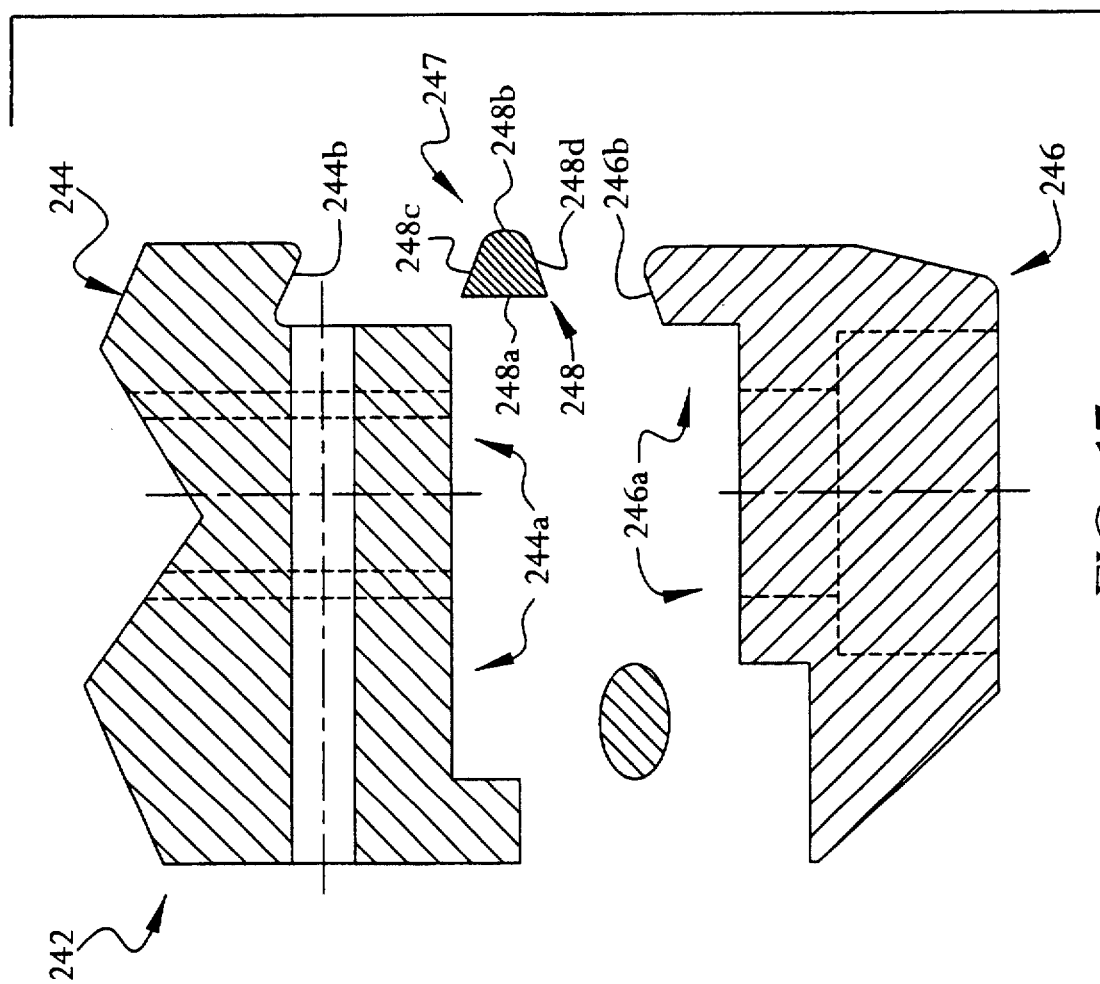
FIG. 15 an exploded view of the sealing portion shown in FIG. 14.

A further alternative embodiment of the invention is depicted in FIGS. 14 and 15. The embodiment comprises a blow-pin assembly 242. The physical and functional characteristics the blow-pin assembly 242 are substantially identical to those of the blow-pin assembly 198, with the following exceptions.

The blow-pin assembly 242 comprises a circular body 244, a ring member 246, and an O-ring 248. The body 244 has a bottom surface 244a, and the ring member 246 includes a top surface 246a. The body 244 is coupled to the ring member 246 by way of the bottom surface 244a and the top surface 246a. The bottom surface 244a and the top surface 246a define a circular groove 250 (see FIG. 14). The groove 250 receives the O-ring 248.

The O-ring 248 is preferably formed from an elastic material such as rubber. The O-ring 248 has an inboard portion 248a and an outboard portion 248b. The O-ring 248 also includes an upper portion 248c and a lower portion 248d. The upper portion 248c and the lower portion 248d each adjoin the inboard portion 248a and the outboard portion 248b. The length of the inboard portion 248a is greater than the length of the outboard portion 248b. The upper portion 248c and the lower portion 248d are about equal in length. These geometric relationships give the O-ring 248 a wedge shape, as is best shown in FIG. 15.

The bottom surface 244a of the body 244 has an angled portion 244b (see FIG. 15). The angled portion 244b and the upper portion 248c of the O-ring 248 are oriented in a substantially identical manner when the O-ring 248 is positioned within the groove 250. The upper surface 246a of the ring member 246 has an angled portion 246b. The angled portion 246b and the lower portion 248d of the O-ring 248 are oriented in a substantially identical manner when the O-ring 248 is positioned within the groove 250.

The groove 250 is pressurized by the air used in the blow-molding process. Pressurization of the groove 250 during blow-molding operations urges the O-ring 248 outward. In particular, the outboard portion 248b is urged into contact with a parison 251 positioned along an outer circumference of the blow-pin assembly 242. This contact inhibits leakage of air between the parison 251 and the blow-pin assembly 242. Furthermore, the pressurization of the groove 250 urges the seal upper portion 248c into the angled portion 244b of the body 244. The groove pressurization also urges the lower portion 248d of the O-ring 248 into the angled portion 246b of the ring member 246. This contact inhibits leakage of pressurized air from the groove 250.

Figure 16:
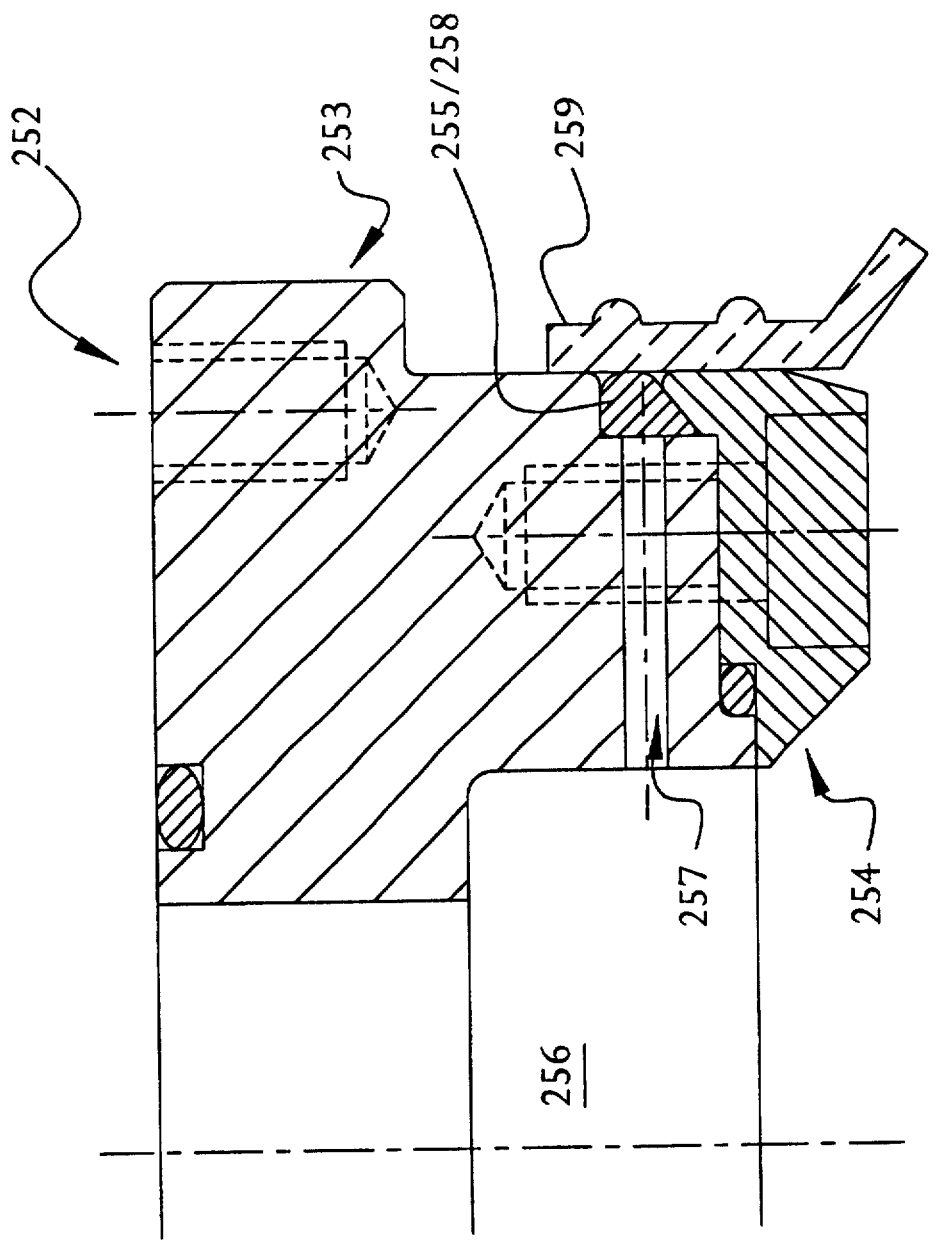
FIG. 16 is a detailed view of an alternative embodiment of the sealing portion of the blow-pin assembly shown in FIG. 2.
Figure 17:
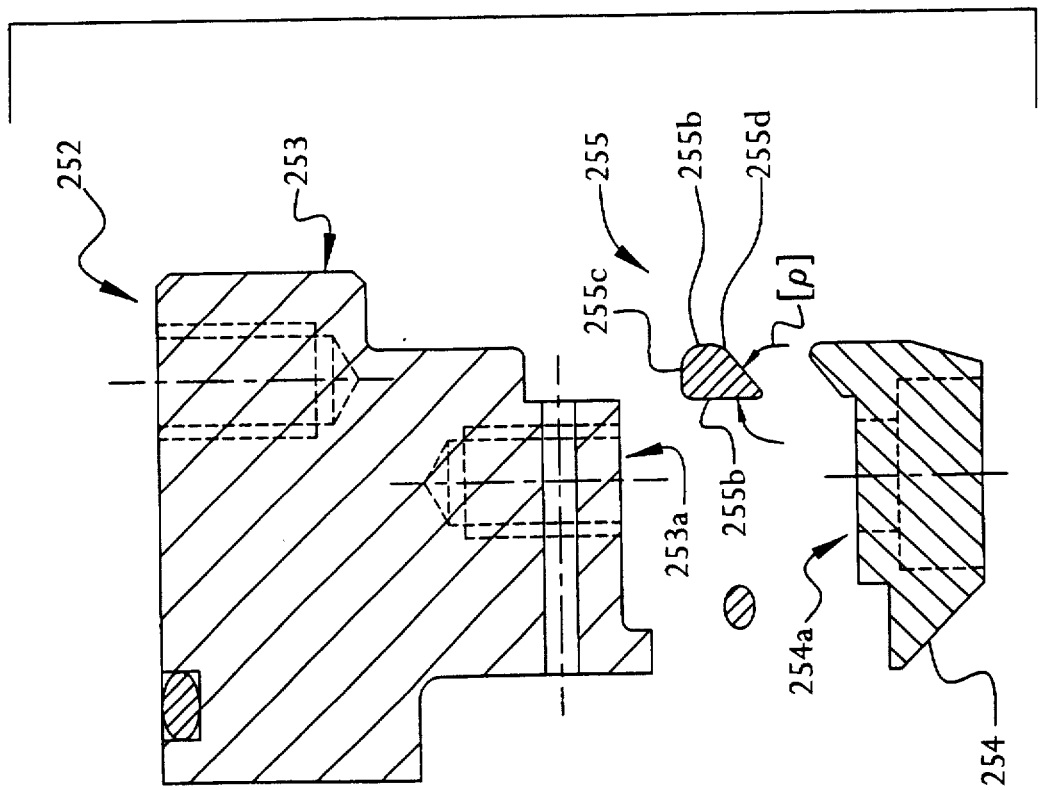
FIG. 17 an exploded view of the sealing portion shown in FIG. 16.

Another possible embodiment of the invention is shown in FIGS. 16 and 17. The embodiment comprises a blow-pin assembly 252. The physical and functional characteristics the blow-pin assembly 252 are substantially identical to those of the blow-pin assembly 198, with the following exceptions.

The blow-pin assembly 252 includes a circular body 253, a ring member 254, and a seal band 255. The body 253 has bottom surface 253a. The ring member 254 includes a top surface 254a. The body 253 is coupled to the ring member 254 by way of the bottom surface 253a and the top surface 254a. The body 253 and the ring member 254 define a central passage 256. The body 253 includes a plurality of through holes 257.

The seal band 255 has an inboard portion 255a, an outboard portion 255b, an upper portion 255c, and an angled portion 255d, as shown in FIG. 17. The inboard portion 255a is oriented in a substantially vertical direction when the blow-pin assembly 252 is assembled. The upper portion 255c adjoins the inboard portion, and is oriented in a substantially horizontal direction. The outboard portion 255b has a substantially curvilinear profile, and adjoins the upper portion 255c. The angled portion 255d adjoins the inboard portion 255a and the outboard portion 255b. The angled portion 255d is disposed at an oblique angle in relation to the inboard portion 255a. This angle is denoted by the symbol "ρ" in FIG. 17. Preferably, ρ is between about fifty and sixty degrees. This geometric configuration provides the seal band 255 with a substantially triangular cross-section, as shown in the figures.

The ring member top surface 254a has an angled portion 254b. The angled portion 254a is oriented in a substantially identical orientation to the angled portion 255d of the seal band 255. The body bottom surface 253a includes a vertical portion 253b and an adjoining horizontal portion 253c. The surface portions 254b, 253b, and 253c define a circular groove 258 when the ring member 254 is coupled to the body 253. The groove 258 has a cross-section substantially identical to the cross section of the seal band 255.

The groove 258 receives the seal band 255, as shown in FIG. 16. Pressurized air is directed to the groove 258 during blow-molding operations. More particularly, pressurized air is routed from the central passage 256 by way of the through holes 257. The air pressurizes the groove 258. The pressurization urges the seal band 255 outward, into a parison 259 positioned along the exterior of the blow-pin assembly 252. The resulting contact between the outboard portion 255b of the seal band 255 and the parison 259 inhibits leakage of air between the parison 259 and the blow-pin assembly 252.

Figure 18:
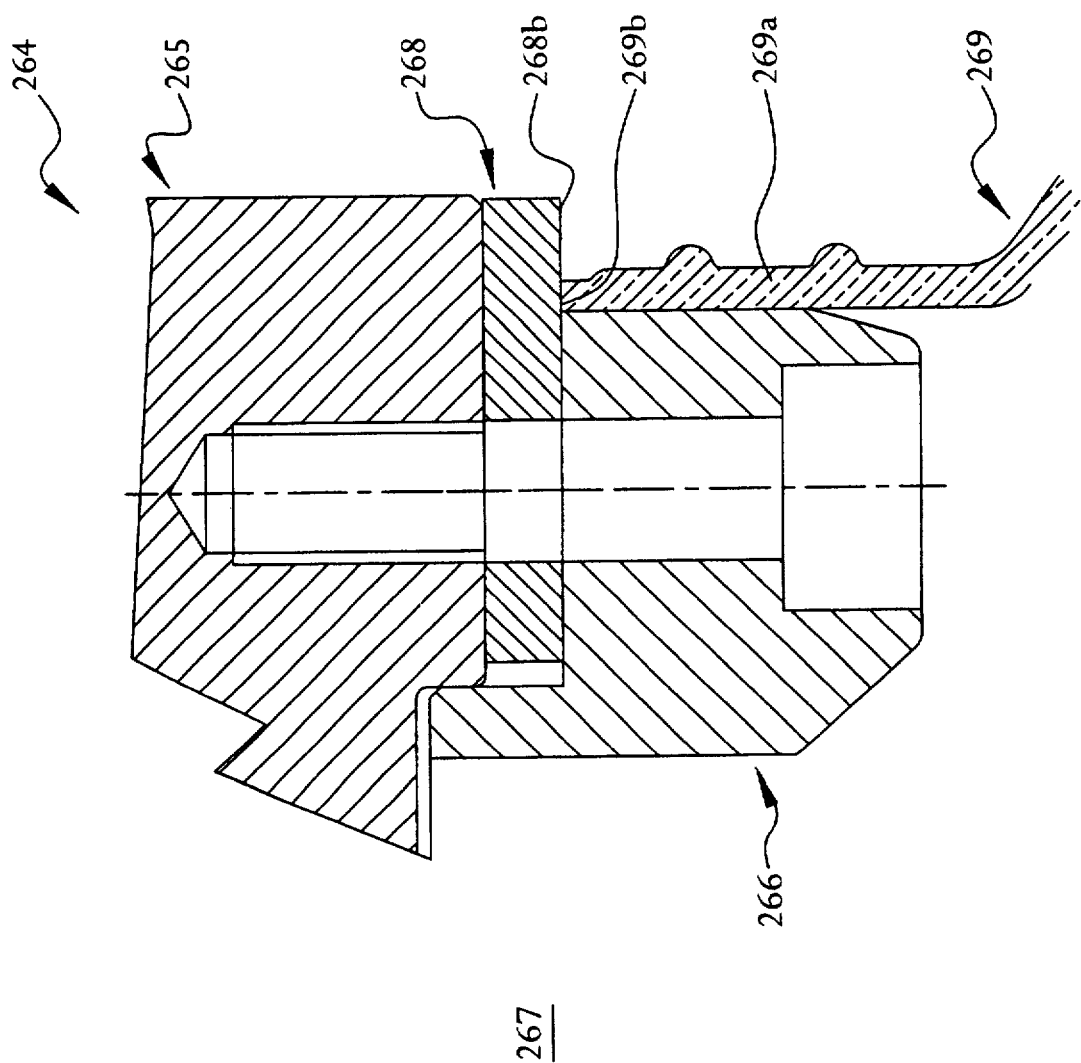
FIG. 18 is a detailed view of an alternative embodiment of the sealing portion of the blow-pin assembly shown in FIG. 2.
Figure 19:
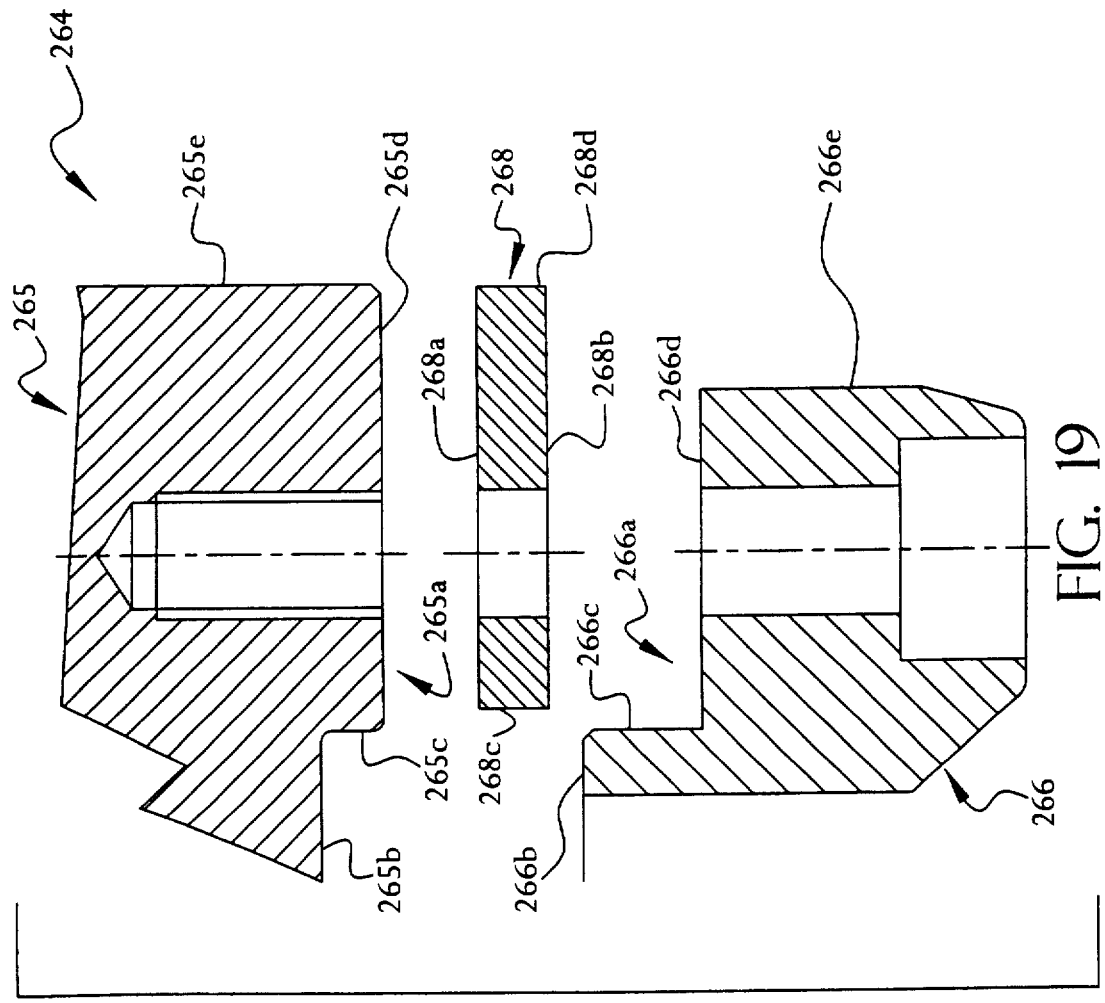
FIG. 19 an exploded view of the sealing portion shown in FIG. 18.

Another alterative embodiment of the invention is shown in FIGS. 18 and 19. FIGS. 18 and 19 illustrate a blow-pin assembly 264. The blow-pin assembly 264 comprises a circular body 265, a ring member 266. The body 265 and the ring member 266 define a central passage 267. The physical and functional characteristics the blow-pin assembly 264 are substantially identical to those of the blow-pin assembly 100, with the following exceptions.

The blow-pin assembly 264 further comprises a circular gasket 268. The gasket 268 is preferably formed from an elastic material such as rubber. The blow-pin assembly 264 does not utilize a seal band, and the body 265 does not include through holes between the passage 267 and the gasket 268.

The body 265 has a bottom surface 265a. The bottom surface 265a includes a first horizontal portion 265b, a vertical portion 265c, and a second horizontal portion 265d (see FIG. 19). The ring member 266 has a top surface 266a. The top surface 266a includes a first horizontal portion 266b, a vertical portion 266c, and a second horizontal portion 266d.

The gasket 268 has a top surface 268a and an opposing bottom surface 268b (see FIG. 19). The gasket 268 also includes an inboard edge 268c and an outboard edge 268d. The body 265 is coupled to the ring member 266 by way of the gasket 268. More particularly, the second horizontal portion 265d of the bottom surface 265 abuts the top surface 268a of the gasket 268 when the blow-pin assembly 264 is assembled. In addition, the second horizontal portion 266d of the bottom surface 266 abuts the bottom surface 268b of the gasket 268. The gasket 268 thereby inhibits leakage of pressurized air from the central passage 267 during blow-molding operations.

The length of the second horizontal portion 265d of the bottom surface 265a exceeds the length of the second horizontal portion 266d of the top surface 266. Hence, the second horizontal portion 265d extends beyond an outer circumferential edge 266e of the ring member 266 when the blow-pin assembly 264 is assembled. Furthermore, the outboard edge 268d of the gasket 268 is substantially aligned with an outer circumferential edge 265e of the body 265. Thus, the gasket 268 also extends beyond the outer circumferential surface 266e of the ring member 266.

A parison 269 is positioned on the ring assembly 266 during blow-molding operations (see FIG. 18). More particularly, a neck portion 269a of the parison 269 is placed over the outer circumferential edge 266e of the ring member 266. An upper edge 269b of the neck portion 269a abuts the bottom surface 268b of the gasket 268 when the parison 269 is so positioned. This contact inhibits leakage of pressurized air between the parison 269 and the ring member 266.

The vertical portion 265c of the bottom surface 265a radially abuts the vertical portion 266c of the top surface 266a when the blow-pin assembly 264 is in its assembled state. This contact prevents lateral movement between the body 265 and the ring member 266.

Figure 20:
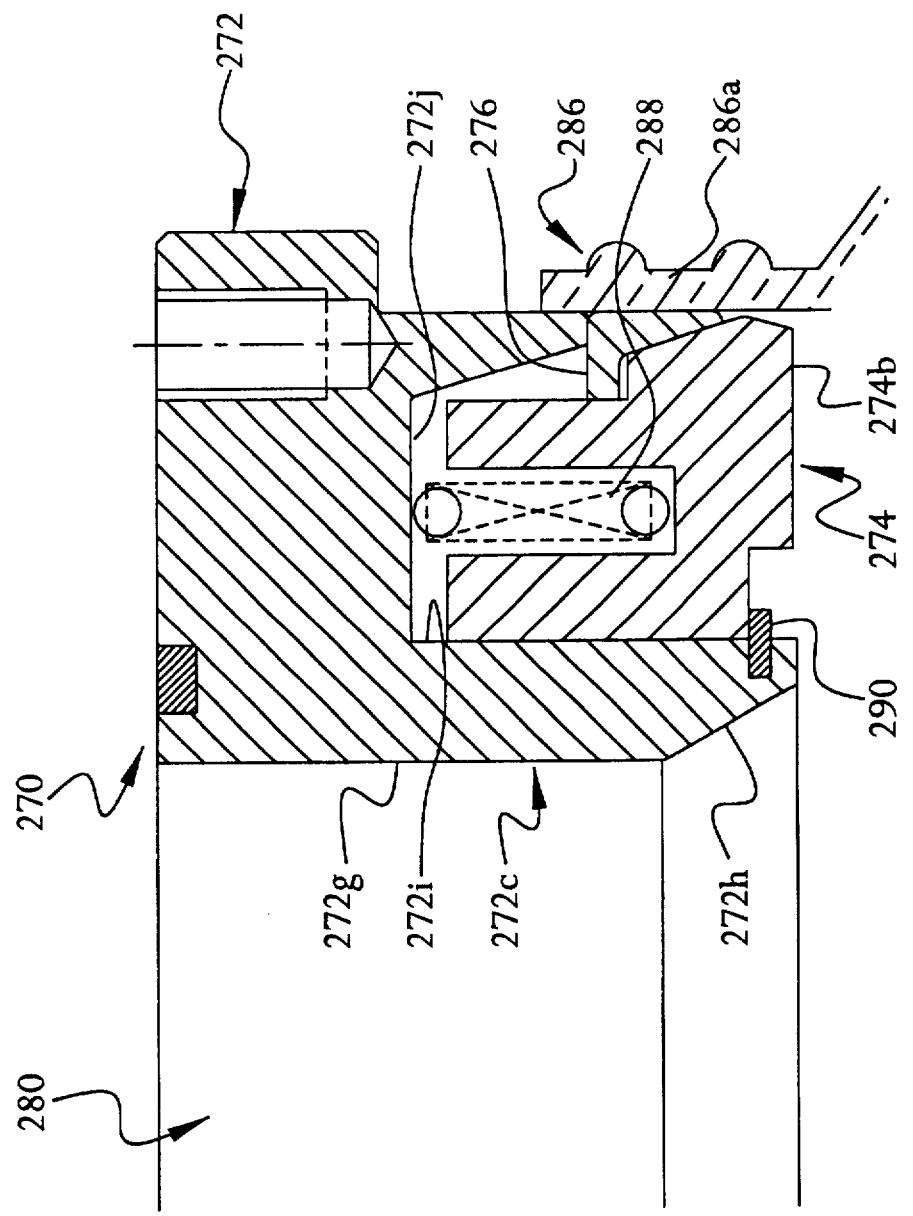
FIG. 20 is a detailed view of an alternative embodiment of the sealing portion of the blow-pin assembly shown in FIG. 2.
Figure 21:
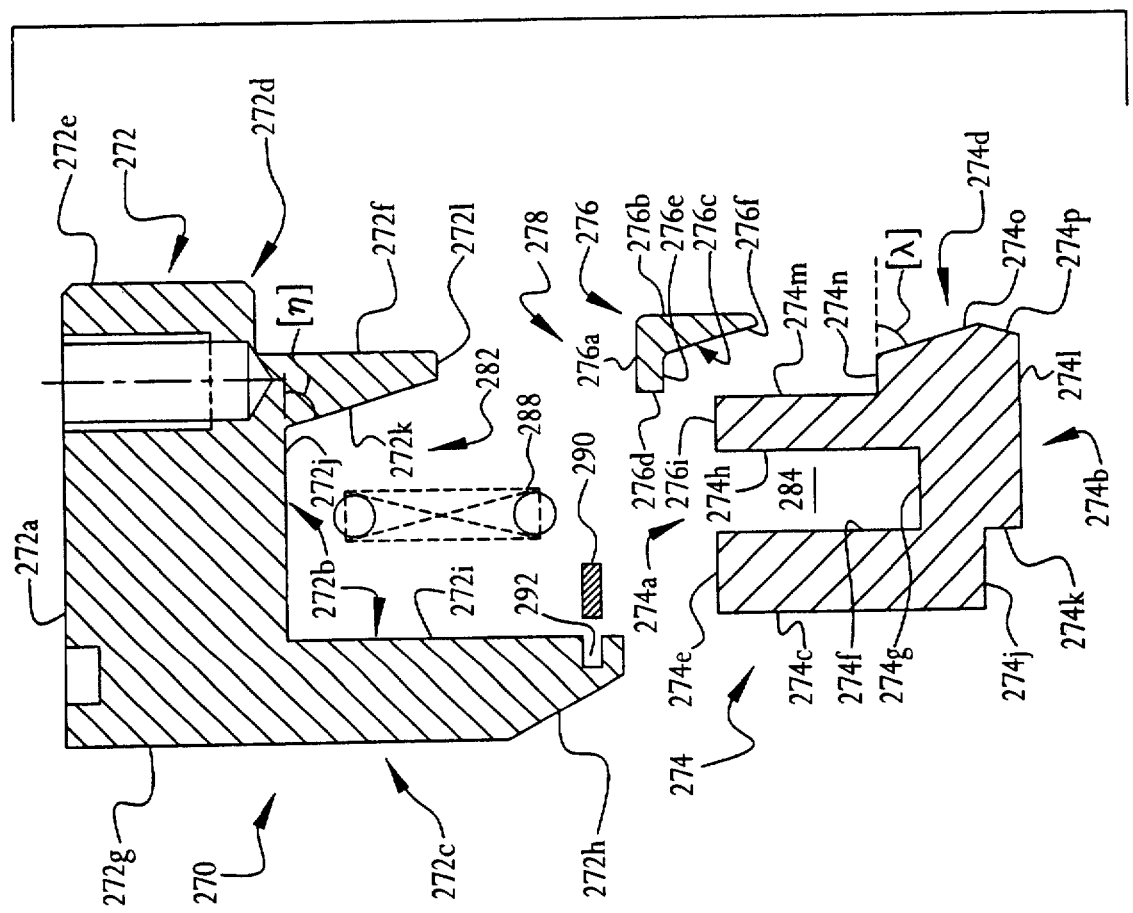
FIG. 21 an exploded view of the sealing portion shown in FIG. 20.

A further alternative embodiment of the invention is shown in FIGS. 20 and 21. The alternative embodiment comprises a blow-pin assembly 270. The blow-pin assembly 270 can be used in conjunction with a blow-molding apparatus such as the blow-molding apparatus 136 described above, i.e., the blow-pin assembly 270 can be substituted for the blow-pin assembly 100 in the blow-molding apparatus 136. Hence, the blow-pin assembly 270 is described below in reference to the blow-molding apparatus 136.

The blow-pin assembly 270 includes a circular body 272, an actuator ring 274, and a seal band 276. The actuator ring 274 and the seal band 276 form a seal assembly 278.

The body 272 has a top surface 272a, an opposing bottom surface 272b, an inner circumferential surface 272c, and an outer circumferential surface 272d (see FIG. 21). The outer circumferential surface 272d has an upper portion 272e and a lower portion 272f. The inner circumferential surface 272c has a vertical portion 272g and an angled portion 272h. The surface portions 272g and 274h define a central passage 280, as shown in FIG. 20. Pressurized air is supplied to the passage 280 during blow-molding operations, in the manner described above in connection with the blow-molding apparatus 136 and the blow-pin assembly 100.

The bottom surface 272b includes a vertical portion 272i, a first horizontal portion 272j, an angled portion 272k, and a second horizontal portion 272l. The horizontal portion 272j adjoins the vertical portion 272i and the angled portion 272k, as is most clearly shown in FIG. 21. The top surface 274a includes a first horizontal portion 274e, a first vertical portion 274f, a second horizontal portion 274g, a second vertical portion 274h, and a third horizontal portion 274i. The horizontal portions 274f and 274h define a spring recess 284. The significance of the spring recess 284 is discussed below.

The bottom surface 274b of the actuator ring 274 includes a first horizontal portion 274j, a vertical portion 274k, and a second horizontal portion 274*l*. The outer circumferential surface 274*d* includes a vertical portion 274*m*, a horizontal portion 274*n*, a first angled portion 274*o*, and a second angled portion 274*p*. The first angled portion 274*o* is disposed at an oblique angle in relation to a projection of the horizontal portion 274*n*. This angle is denoted by the symbol "λ" in FIG. 21. Preferably, λ is between about between about sixty and eighty degrees. Most preferably, λ is about seventy degrees.

The seal band 276 includes a top surface 276*a* and an adjoining outer circumferential surface 276*b*, as shown in FIG. 21. The seal band 276 also includes an inner circumferential surface 276*c*. The inner circumferential surface 276*c* includes a vertical portion 276*d*, a horizontal portion 276*e*, and an angled portion 276*f*. The vertical portion 276*d* adjoins the top surface 276*a* and the horizontal portion 276*e*. The angled portion 276*f* adjoins the horizontal portion 276*e* and the outer circumferential surface 276*b*. The angled portion 276*f* and the actuator ring angled portion 274*o* are disposed in substantially identical orientations when the blow-pin assembly 270 assembled (as shown in FIG. 20). The noted geometric configuration of the seal band 276 gives the seal band 276 an L-shaped profile. Furthermore, the relative orientations of the angled portion 276*f* and the outer circumferential edge 276*b* give the lower section of the seal band 276 a wedge shape. The significance of this feature is discussed below.

The seal band 276 is formed from a durable material, i.e., from a material having a high degree of abrasion resistance in comparison to a typical thermoplastic parison. Preferably, the seal band 276 is formed from a material having a hardness comparable to or greater than that of a relatively soft metal such as brass, i.e., the seal band 276 preferably has a Brinell hardness number about equal to or greater than 100. Most preferably, the seal band 276 is formed from a stainless steel, e.g., 301 stainless steel. The seal band 276 has one split line. The vertical surface portion 276*d* is preferably machined with a scalloped finish so as to facilitate flexing of the seal band 276.

The actuator ring 274 is partially disposed within the recess 282 when the blow-pin assembly 270 is in its assembled state. In addition, the angled portion 276*f* of the seal band 276 abuts the angled portion 274*o* of the actuator ring 274 when the blow-pin assembly 270 is so configured. Furthermore, the vertical portion 276*d* of the seal band 276 abuts the vertical portion 274*m* of the actuator ring 274.

The actuator ring 274 is shown in a retracted position in FIG. 20. The actuator ring 274 is disposed in this position when blow-molding operations are not underway. The actuator ring 274 translates upward, i.e., toward the horizontal portion 272*j* of the body bottom surface 272*b*, upon the commencement of blow-molding operations (this feature is explained in detail below).

The actuator ring 274 is biased downward, i.e., toward its retracted position, by one or more springs 288. The springs 288 are disposed within the recess 284, as shown in FIG. 20. The springs 288 abut the horizontal portion 274*g* of the ring member top surface 274*a*. The springs 288 also abut the horizontal portion 272*j* of the body bottom surface 272*b*. The actuator ring 274 is restrained from moving downward, past its retracted position, by a retaining ring 290. The retaining ring 290 is disposed in a circumferential notch 292 defined by the body 272.

A parison 286 is positioned along the exterior of the blow-pin assembly 270 during blow-molding operations, as shown in FIG. 20. In particular, a neck portion 286*a* of the parison 286 engages the outer circumferential surface 276*b* of the seal band 276.

The bottom surface 274*b* of the actuator ring 274 is exposed to pressurized air during blow-molding operations. For example, the blow-pin assembly 270 can be substituted for the blow-pin assembly 100 in the previously-described blow-molding apparatus 136. Hence, in this particular application, the bottom surface 274*b* of the actuator ring 274 is exposed to the pressurized air supplied to the cavity 140. The top surface 274*a*, in contrast, is not directly exposed to pressurized air. The top surface 274*a* is thus subject to a lower pressure than the bottom surface 274*b*. The resulting pressure differential between the bottom surface 274*b* and the top surface 274*a* urges the actuator 274 upward, against the bias of the springs 288. Upward movement of the seal band 276 is eventually restrained by the abutment of the seal band top surface 276*a* against the horizontal portion 272*l* of the body 272.

The upward movement of the actuator ring 274 urges the seal band 276 outward, thereby increasing the contact force between the seal band 276 and the parison neck portion 286*a*. More particularly, the angled portion 274*o* of the actuator ring outer circumferential surface 274*d* slidably engages the angled portion of the seal inner circumferential surface 276*c* as the actuator ring 274 is urged upward. This contact, in conjunction with the wedge-shaped profile of the seal band 276, urges the seal band 276 upward and outward. The resulting increase in contact pressure between the seal outer circumferential surface 276*b* and the parison neck portion 286*a* increases the sealing effectiveness of the blow-pin assembly 270, i.e., the increased contact pressure further inhibits leakage of pressurized air between the parison 286 and the blow-pin assembly 270.

The L-shaped cross-section of the seal band 276 prevents the seal band 276 from being pulled out of the blow-pin assembly 270 as the newly-formed container is removed from the assembly 270. In particular, the L-shaped profile prevents the seal band 276 from separating from the assembly 270 in the event the seal band 276 becomes embedded in the parison neck portion 286*a* during the blow-molding process. Specifically, the horizontal portion 276*e* of the seal 276 abuts the horizontal portion 274*n* of the actuator ring 274 if the seal band 276 is forced downward during removal of the container. This contact restrains the downward movement of the seal band 276, thereby preventing the seal band 276 from separating from the blow-pin assembly 270.

Figure 22:
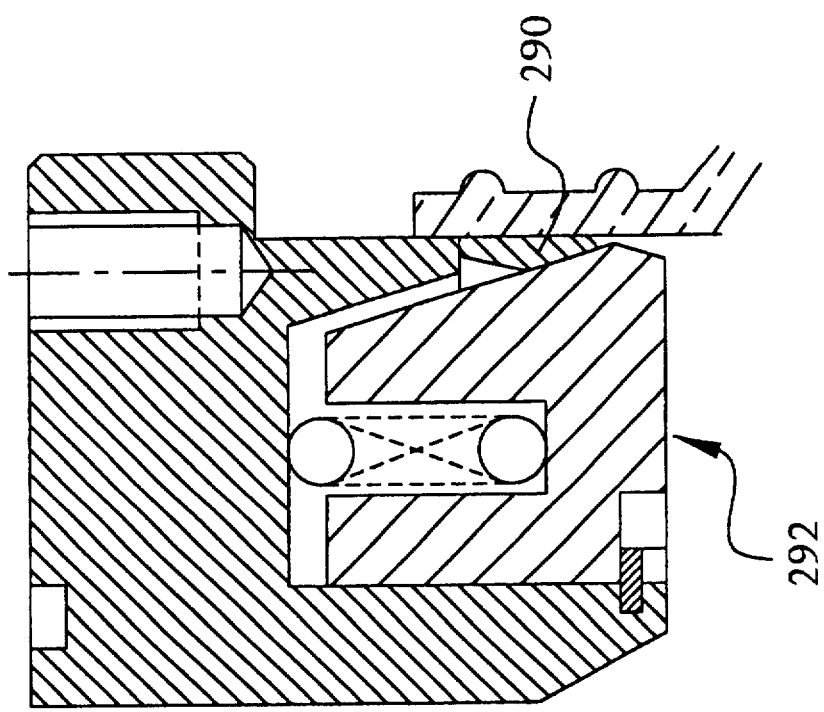
FIG. 22 is a detailed view of an alternative embodiment of the sealing portion of the blow-pin assembly shown in FIG. 2.
Figure 23:
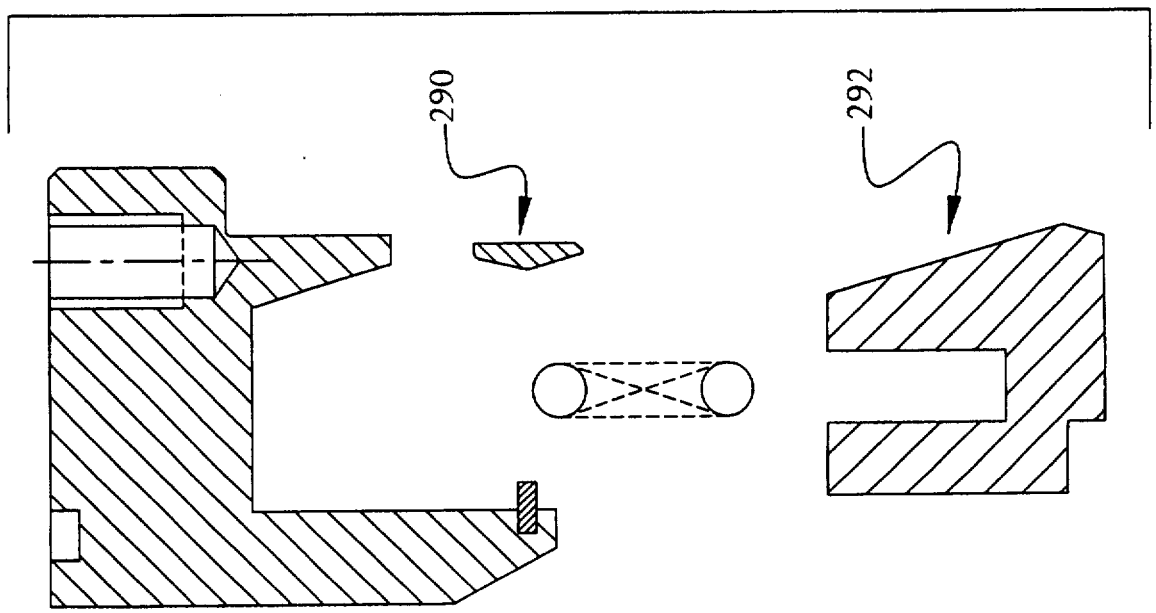
FIG. 23 an exploded view of the sealing portion shown in FIG. 22.

The seal band 276 is a most preferred configuration. Other configurations for the seal band 276 are also within the contemplated scope of the invention. For example, FIGS. 22 and 23 depict a seal band 290 and an actuator ring 292 that are similar to the seal band 276 and the actuator ring 274, with the following exception. The seal band 290 and the actuator ring 292 do not possess the above-described features that retain the seal band 276 in the event the seal band 276 becomes embedded in the parison neck portion 286*a*. More particularly, the seal band 290 and the actuator ring 292 do not have overlapping segments such as the surface portions 276*e* and 274*n* of the seal band 276 and the actuator ring 274.

The above-noted alternative embodiments are presented for exemplary purposes only, and are not meant to be an exclusive listing of all alternative embodiments within the contemplated scope of the invention. Furthermore, it is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of the parts, within the principles of the invention to the full extent indicated by the broad general meaning of the terms in which the appended claims are expressed.

What is claimed is:

1. A blow-pin assembly using pressurized air to blow mold hollow objects from parisons, comprising:

a circular body having (i) an outer circumferential surface for receiving the parison neck portion, (ii) a central passage for receiving pressurized blow air, (iii) a circular groove formed in the outer circumferential surface, the groove having a contact surface, and (iv) a through hole formed between the central passage and the groove for directing the pressurized air from the central passage to the groove; and an annular seal band having first and second contact surfaces, the second contact surface having a substantially identical geometric profile to the contact surface of the groove, the seal band being retained in the groove so that the pressurized air from the cental passage urges the first contact surface of the seal band into contact with the parison and urges the second contact surface of the seal band into surface contact with the contact surface of the groove, whereby the seal band inhibits leakage of the pressurized air from both the parison and the groove.

2. The blow-pin assembly of claim 1, wherein the seal band is formed from a material having a Brinell hardness number of at least 100.

3. The blow-pin assembly of claim 1, wherein the seal band is formed from stainless steel.

4. The blow-pin assembly of claim 1, wherein the seal band has a substantially V-shaped cross section.

5. The blow-pin assembly of claim 4, wherein the groove has a first notch and a second notch and the seal band has a first edge disposed in the first notch and a second edge disposed in the second notch.

6. The blow-pin assembly of claim 1, wherein the seal band has a substantially U-shaped cross section.

7. The blow-pin assembly of claim 1, wherein the seal band has a substantially triangular cross section.

8. The blow-pin assembly of claim 1, wherein the seal band has one split line.

9. The blow-pin assembly of claim 8, further comprising an elastic O-ring disposed within the groove between the through hole and the seal band and being urged into contact with the seal band by the pressurized air.

10. A blow-pin assembly using pressurized air to blow mold hollow objects from parisons comprising:

a circular body having an outer circumferential surface for receiving the parison neck portion, a bottom surface, a first circular recess adjoining the bottom surface and the outer circumferential surface, a central passage for receiving pressurized air, and a through hole formed between the central passage and the first recess for directing the pressurized air from the central passage to the first recess;

a ring member having a top surface fixedly coupled to the body bottom surface, the top surface defining a second recess that is substantially aligned with the first recess, the first and the second recesses forming a groove; and an annular seal band retained within the groove and urged into contact with the parison neck portion by the pressurized air, whereby the seal band inhibits leakage of the pressurized air between the parison and the blow-pin assembly.

11. The blow-pin assembly of claim 10, wherein the seal band includes an outboard edge having first and second contact surfaces and the groove includes a contact surface having a substantially identical geometric profile to the second contact surface, the seal band being retained in the groove so that the pressurized air from the cental passage urges the first contact surface of the seal band into contact with the parison and urges the second contact surface of the seal band into surface contact with the contact surface of the groove, whereby the seal band inhibits leakage of the pressurized air from both the parison and the groove.

12. The blow-pin assembly of claim 10, wherein the seal band is formed from a material having a Brinell hardness number of at least 100.

13. The blow-pin assembly of claim 10, wherein the seal band is formed from stainless steel.

14. The blow-pin assembly of claim 10, wherein the seal band has a substantially V-shaped cross section.

15. The blow-pin assembly of claim 14, wherein the groove has a first notch and a second notch and the seal band has a first edge disposed in the first notch and a second edge disposed in the second notch.

16. The blow-pin assembly of claim 10, wherein the seal band has a substantially U-shaped cross section.

17. The blow-pin assembly of claim 10, wherein the seal band has a substantially triangular cross section.

18. The blow-pin assembly of claim 10, wherein the seal band has one split line.

19. The blow-pin assembly of claim 18, further comprising an elastic O-ring disposed within the groove between the through hole and the seal band and being urged into contact with the seal band by the pressurized air.

20. A blow-pin assembly using pressurized air to blow mold hollow objects from parisons, comprising:

a circular body having an outer circumferential surface for receiving the parison neck portion, a bottom surface defining a circular recess, and a central axis;

an actuator ring slidably disposed within the body recess and having an outer circumferential surface, the actuator ring translating axially in a first direction in response to pressurized air; and an annular seal band slidably disposed around the actuator ring outer circumferential surface, the translation of the actuator ring in the first direction urging the seal band into the parison, whereby the seal band inhibits leakage of the pressurized air between the parison and the blow-pin assembly.

21. The blow-pin assembly of claim 20, wherein the body has a central passage for receiving the pressurized air and the actuator ring has a bottom surface, the actuator ring bottom surface and the central passage being in fluid communication.

22. The blow-pin assembly of claim 20, wherein the body bottom surface has a substantially planar portion being substantially perpendicular to the first direction and the seal band is adapted to abut the substantially planar portion, the abutment of the seal band and the substantially planar portion restraining the seal band in the first direction.

23. The blow-pin assembly of claim 20, wherein the seal band includes an inner circumferential surface having an angled portion being oblique to the central axis, the actuator ring outer circumferential surface has an angled portion being disposed in a substantially similar orientation to the seal band angled portion, the seal band angled portion slidably engaging the actuator ring angled portion in response to the pressurized air, the engagement of seal band angled portion and the actuator ring angled portion urging the seal band into the parison.

24. The blow-pin assembly of claim 20, wherein the seal band has a substantially L-shaped cross-section and the actuator ring has a substantially planar surface being substantially perpendicular to the first direction, the seal band being adapted to abut the substantially planar surface so as to restrain the seal band in a direction substantially opposite the first direction.

25. The blow-pin assembly of claim 20, wherein the blow-pin assembly further comprises a spring and the actuator ring has a spring recess, the spring being disposed within the spring recess so that the spring abuts the actuator ring and the body bottom surface, whereby the actuator ring is biased in a direction substantially opposite the first direction.

26. The blow-pin assembly of claim 20, wherein the blow-pin assembly further comprises a contact ring coupled to the body, the contact ring being adapted to abut the actuator ring so as to restrain the actuator ring in a direction substantially opposite the first direction.

27. The blow-pin assembly of claim 20, wherein the seal band is formed from a material having a Brinell hardness number of at least 100.

28. The blow-pin assembly of claim 20, wherein the seal band is formed from stainless steel.

29. A blow-pin assembly using pressurized air to blow mold hollow objects from parisons, comprising:

a circular body having a bottom surface and an outer circumferential surface for receiving the parison neck portion;

a ring member contacting the body bottom surface; and an O-ring having a substantially triangular cross-section, the O-ring being retained by the body bottom surface and the ring member proximate the body outer circumferential surface so that the O-ring is urged into contact with the parison neck portion in response to pressurized air, whereby the O-ring inhibits leakage of the pressurized air between the parison and the blow-pin assembly.

* * * * *

UNITED STATES PATENT AND TRADEMARK OFFICE
CERTIFICATE OF CORRECTION

PATENT NO. : 6,273,705 B1
DATED : August 14, 2001
INVENTOR(S) : Walter K. Schoch It is certified that error appears in the above-identified patent and that said Letters Patent is hereby corrected as shown below:

Column 2,
Lines 40 and 42, delete "cental" and insert -- central --;

Column 4,
Line 12, after "FIG. 11" insert -- is --;
Line 18, after "FIG. 13" insert -- is --;
Line 24, after "FIG. 15" insert -- is --;
Line 29, after "FIG. 17" insert -- is --;
Line 35, after "FIG. 19" insert -- is --;
Line 40, after "FIG. 21" insert -- is --;
Line 45, after "FIG. 23" insert -- is --;

Column 6,
Line 36, delete "surfaces 106*jl*, 106*k*, and 106*n*" and insert -- surfaces 106*j*, 106*k*, and 106*l* --;

Column 10,
Line 26, after "embodiments" insert -- of --;
Line 29, after "characteristics" insert -- of --;

Column 11,
Line 39, after "characteristics" insert -- of --;
Line 47, delete "give" and insert -- gives --;

Column 12,
Lines 13-14 and 62, after "characteristics" insert -- of --;

Column 15,
Line 7, delete second occurrence of "between about";

Column 17,
Line 22, delete "cental" and insert -- central --;
Line 51, delete "parisons" and insert -- parisons, --;

UNITED STATES PATENT AND TRADEMARK OFFICE
CERTIFICATE OF CORRECTION

PATENT NO.    : 6,273,705 B1
DATED         : August 14, 2001
INVENTOR(S)   : Walter K. Schoch It is certified that error appears in the above-identified patent and that said Letters Patent is hereby corrected as shown below:

Column 18,
Line 8, delete "cental" and insert -- central --.

Signed and Sealed this

Fourteenth Day of September, 2004

JON W. DUDAS
*Director of the United States Patent and Trademark Office*